United States Patent [19]
Reger et al.

[11] Patent Number: 4,926,458
[45] Date of Patent: May 15, 1990

[54] LOW POWER CONTROL APPARATUS FOR A COIN OPERATED TELEPHONE

[75] Inventors: Philip R. Reger, Newtown Square; Patrick J. McGarry, West Chester; Craig A. Lewis, Berwyn, all of Pa.

[73] Assignee: Mars Incorporated, McLean, Va.

[21] Appl. No.: 199,129

[22] Filed: May 26, 1988

[51] Int. Cl.$^5$ .................... H04M 17/02; H04M 1/24
[52] U.S. Cl. .................................. 379/27; 379/155; 379/146
[58] Field of Search ............... 379/155, 143, 146, 27

[56] References Cited

U.S. PATENT DOCUMENTS

| | | | |
|---|---|---|---|
| 3,428,751 | 2/1969 | Edington | 179/6.3 |
| 3,760,101 | 9/1973 | Burns | 379/146 |
| 4,031,325 | 6/1977 | Dudonis et al. | 179/6.3 R |
| 4,039,768 | 8/1977 | O'Maley | 179/175.2 C |
| 4,046,962 | 9/1977 | Rogers | 179/6.3 R |
| 4,074,079 | 2/1988 | Prell et al. | 179/6.3 R |
| 4,326,103 | 4/1982 | Oehrig | 179/6.3 R |
| 4,361,731 | 11/1982 | Smoot | 179/6.3 R |
| 4,567,325 | 1/1986 | Crouch et al. | 179/6.3 R |
| 4,625,078 | 11/1986 | Crouch et al. | 379/145 |
| 4,674,114 | 6/1987 | Crouch et al. | 379/154 |
| 4,742,536 | 5/1988 | Dewenter et al. | 379/97 |
| 4,768,217 | 8/1988 | Asano et al. | 379/32 |
| 4,768,223 | 8/1988 | Kinoshita et al. | 379/143 |

*Primary Examiner*—Stafford D. Schreyer
*Attorney, Agent, or Firm*—Davis Hoxie Faithfull & Hapgood

[57] ABSTRACT

A low power control apparatus for a coin operated telephone controls a full range of phone functions as well as an electronic coin acceptor. The control utilizes phone line power. Power for all the normal operations of the coin operated telephone and its coin acceptor is also supplied from the phone line. The control is preferably microcontroller based and designed utilizing low power components. In the control, an interface circuit serves to connect the phone tip and ring lines to either a power supply circuit or to a totalizer and escrow control circuit. The power supply also provides power to an audio network including a variety of fraud prevention circuits, a modem, and several time generator circuits. A monitor system monitors the status of several security switches to monitor the phone's condition. Hardware and software design features control the application of power to circuits only when needed.

65 Claims, 23 Drawing Sheets

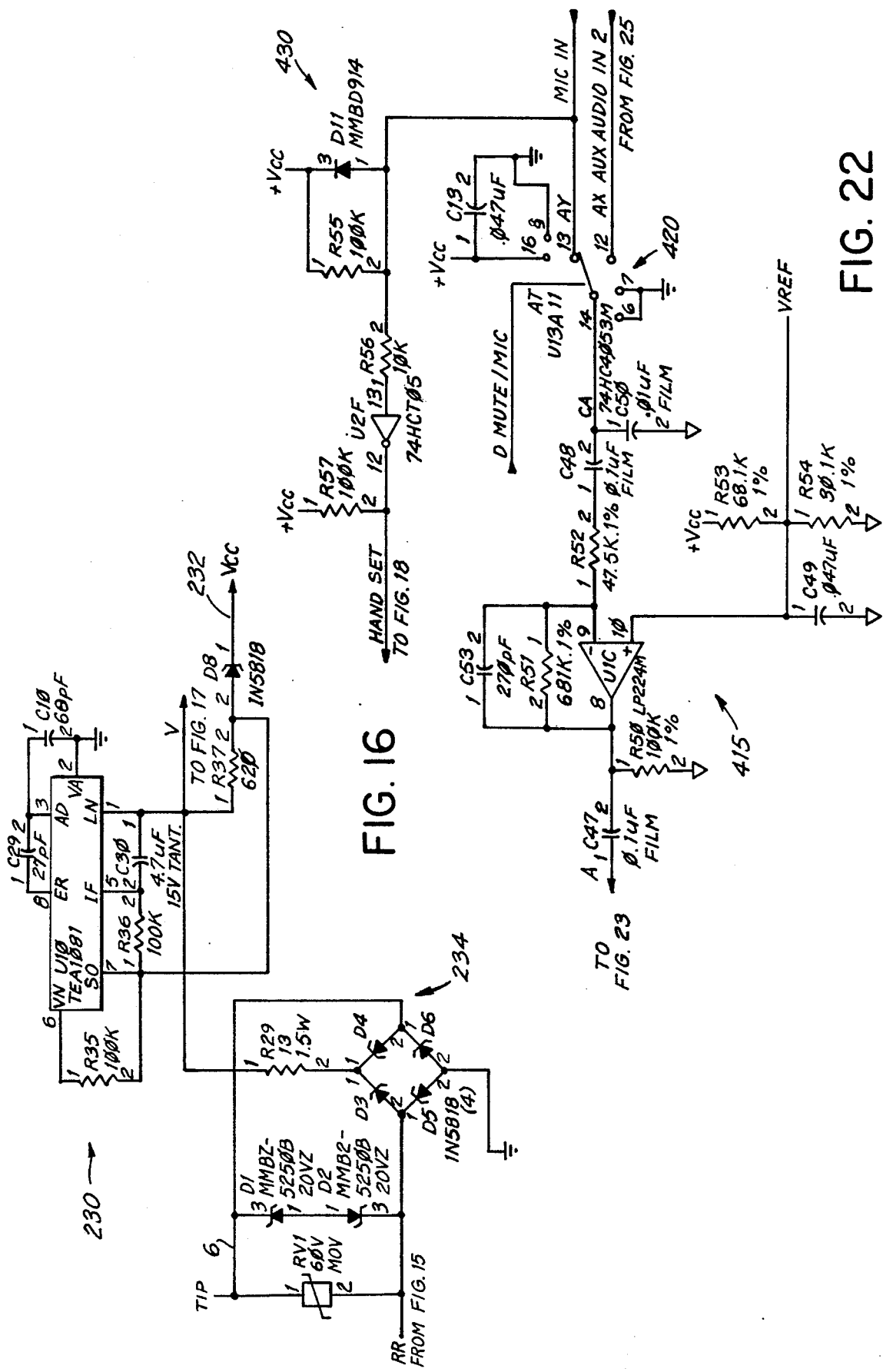

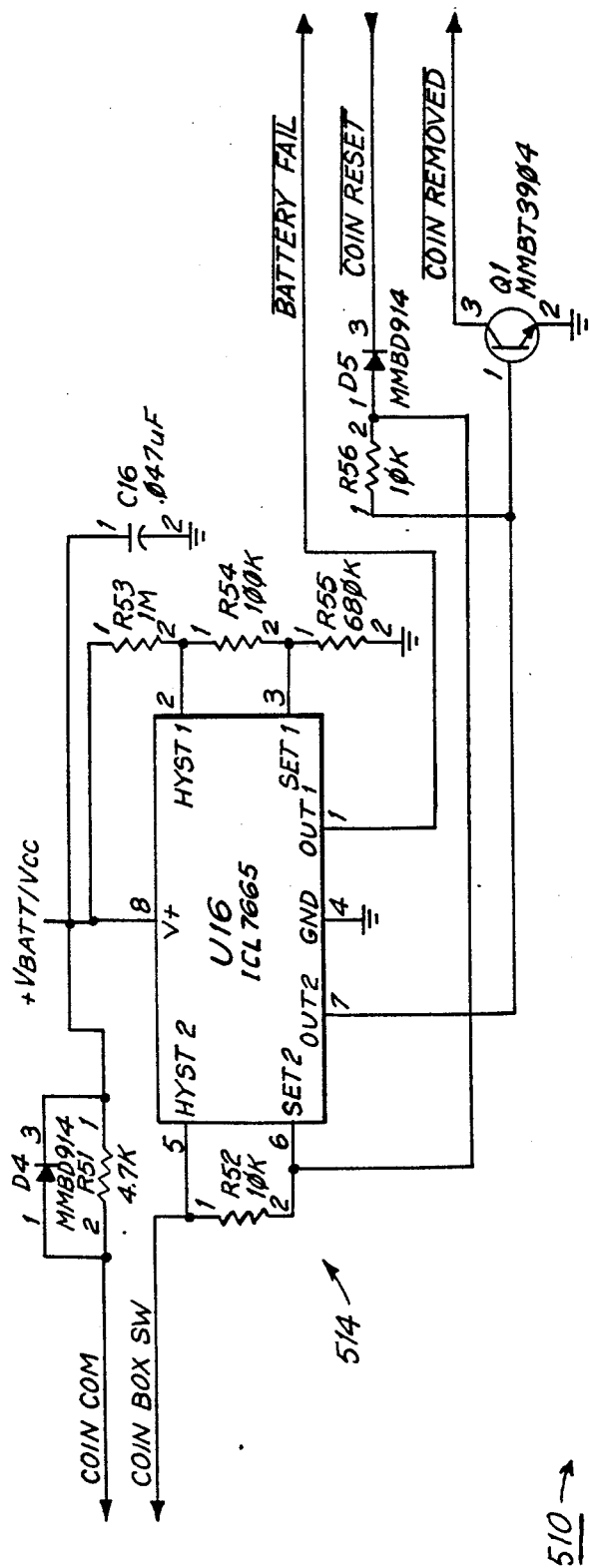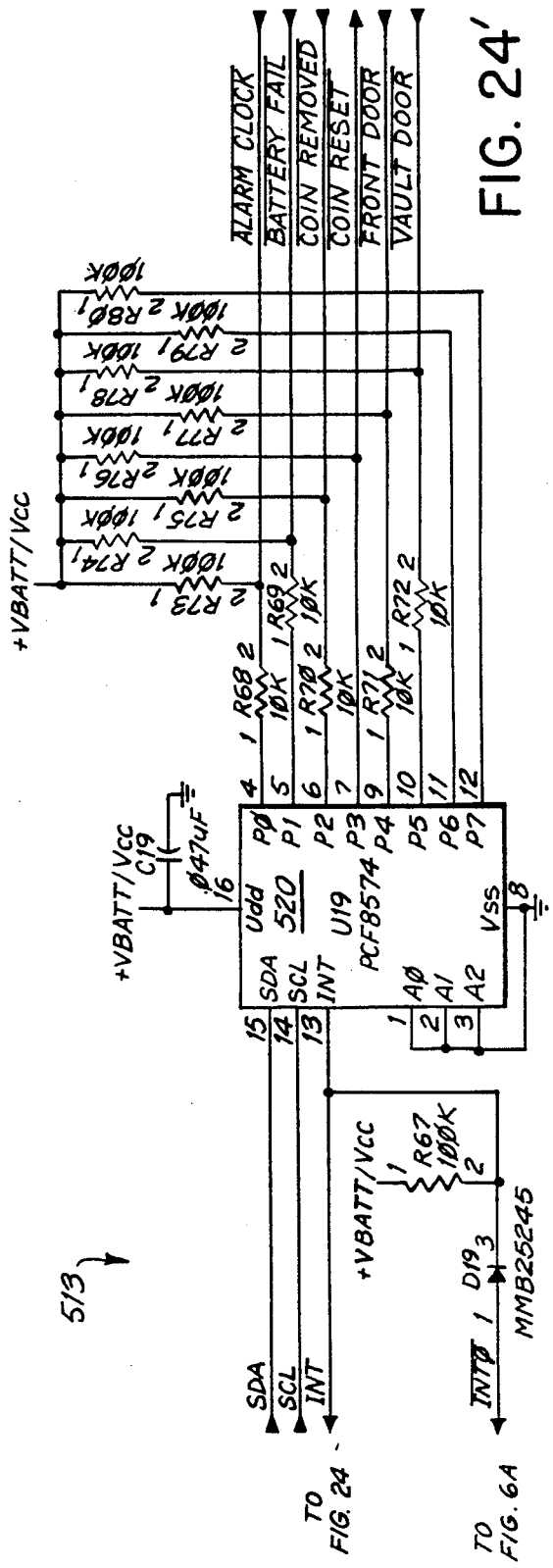
FIG. 24

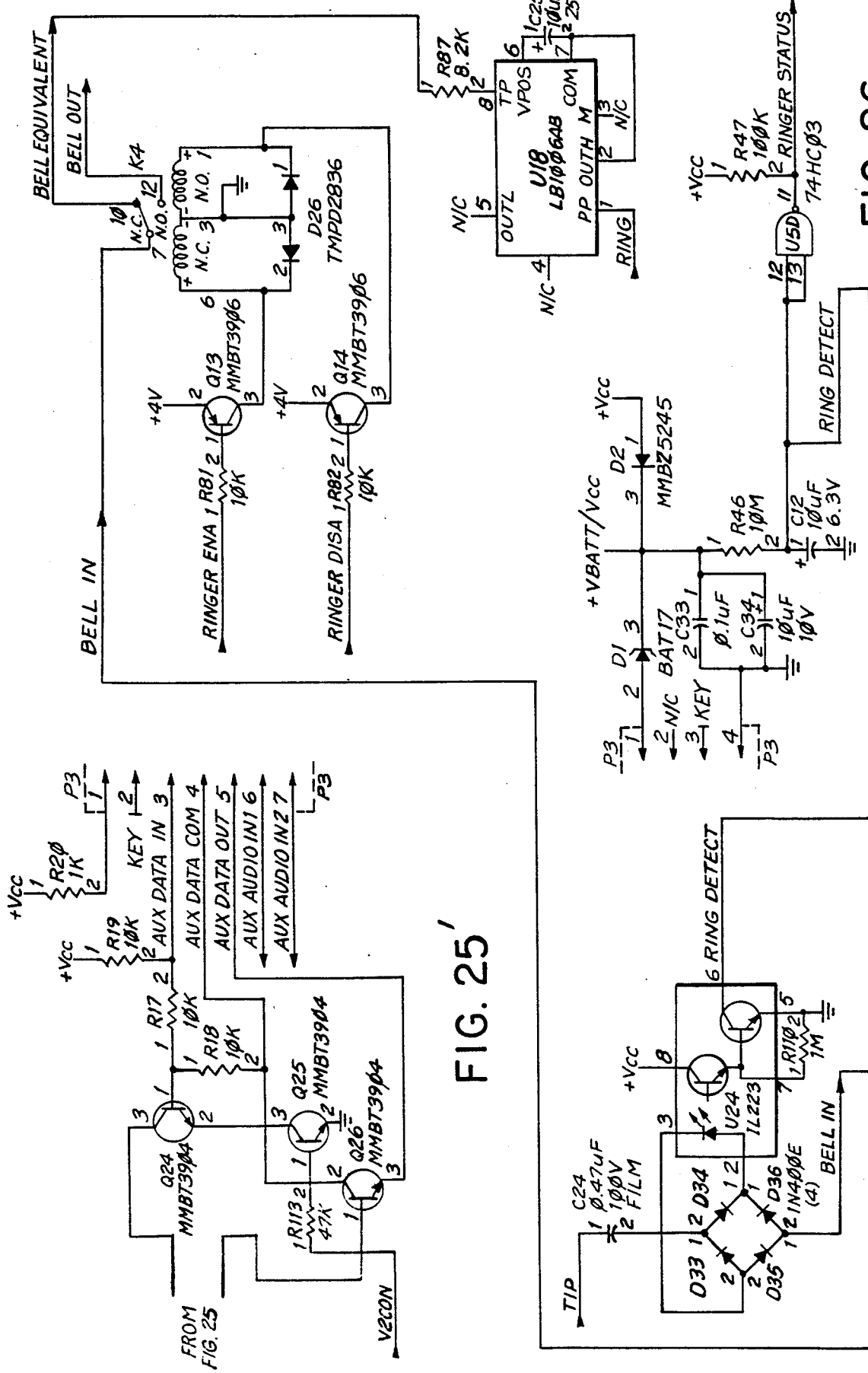

LOW POWER CONTROL APPARATUS FOR A COIN OPERATED TELEPHONE

FIELD OF THE INVENTION

This invention relates to control apparatus for coin operated telephones. More particularly, this invention relates to a low power controller apparatus having a single processing element which controls the operations performed by a coin operated telephone. Those operations may include control of all the functions of an electronic coin acceptor for accepting and validating coins, as well as all of the functions presently found in standard payphones. The present invention includes a unique power distribution management system to accomplish all these functions while operating utilizing power from the phone line.

BACKGROUND OF THE INVENTION

Coin operated telephone stations are interfaced with a central office by a two wire loop circuit. When the handset is lifted off the hook, the central office supplies a very small DC loop current, 23 mA minimum, which is available to the coin operated telephone for use as a source of power. When the handset is on the hook, the coin operated telephone draws virtually no current from the phone line. These extreme limits on the power available from the phone line have limited the functions that are incorporated into coin operated telephone stations.

The vast majority of presently existing coin operated telephones or payphones are electromechanical in nature. See, for example, the "Coin Service Booklet" published by New York Telephone. These payphones include an electromechanical coin mechanism for testing the validity and denomination of coins and a limited number of operational functions and features.

With deregulation of the telephone industry, payphones including a number of electronic functions and features have been introduced. These payphones have taken two approaches to address the demand for additional functions and features, and the constraints of low power operation. In some cases, one or more advanced functions have been incorporated by using an internal battery to supply additional power for performing these functions. Other coin operated telephones have simply not incorporated a full range of advanced functions.

While both the desirability and problems of having a coin operated telephone station which operates with very low power, such as the 23 mA available from the phone lines, are well known, the prior art has not successfully achieved such operation in conjunction with providing a full range of advanced functions as described below.

SUMMARY OF THE INVENTION

As more fully described below, the present invention provides a low power control apparatus for a coin operated telephone, which utilizes a battery for a limited range of functions such as operation of the real time clock, monitoring switches "on hook" and to power the electronics to go "off hook". For all other functions, the present control apparatus utilizes solely phone line power to power its various operations. In one embodiment, control apparatus according to the present invention controls the operation of an electronic coin acceptor for testing coins. In particular, the control apparatus controls the provision of power to the coin detection and test sensors, and any coin directing members, such as a solenoid or an otherwise electrically controlled and mechanically operated coin routing gate. Further, the control apparatus includes a processing circuit for processing coin test data and other output signals from the electronic coin acceptor.

In addition to providing processing support and control signals for an electronic coin mechanism, the present control system may provide control of one or more of the following components and functions: (1) "A relay" control, (2) ring detection, (3) a monitoring system for monitoring payphone status, for example, has the coinbox been opened, (4) coin totalizer control, (5) earpiece volume control, (6) long loop, short loop detection to ascertain the quality of the line, (7) detection of microphone presence, in other words, has the handset been vandalized, for example, has it been torn from the payphone, (8) control of the connection of fraud prevention filters in the speech network, (9) modem control and data transmission for example, transmission of the status of security switches, or coin data such as the number of coins in the coinbox of the payphone, and finally, (10) overall power management and control of the power switched to the various parts and functions of the payphone and the controller to assure low power operation. In the preferred embodiment, control apparatus according to the present invention controls all of the above components and functions in addition to controlling the electronic coin acceptor. To achieve this end while utilizing phone line power, a number of novel low power circuits have been devised as more fully described below.

DESCRIPTION OF THE DRAWINGS

FIG. 16 is a schematic diagram of a preferred power supply circuit;

Figure 2:
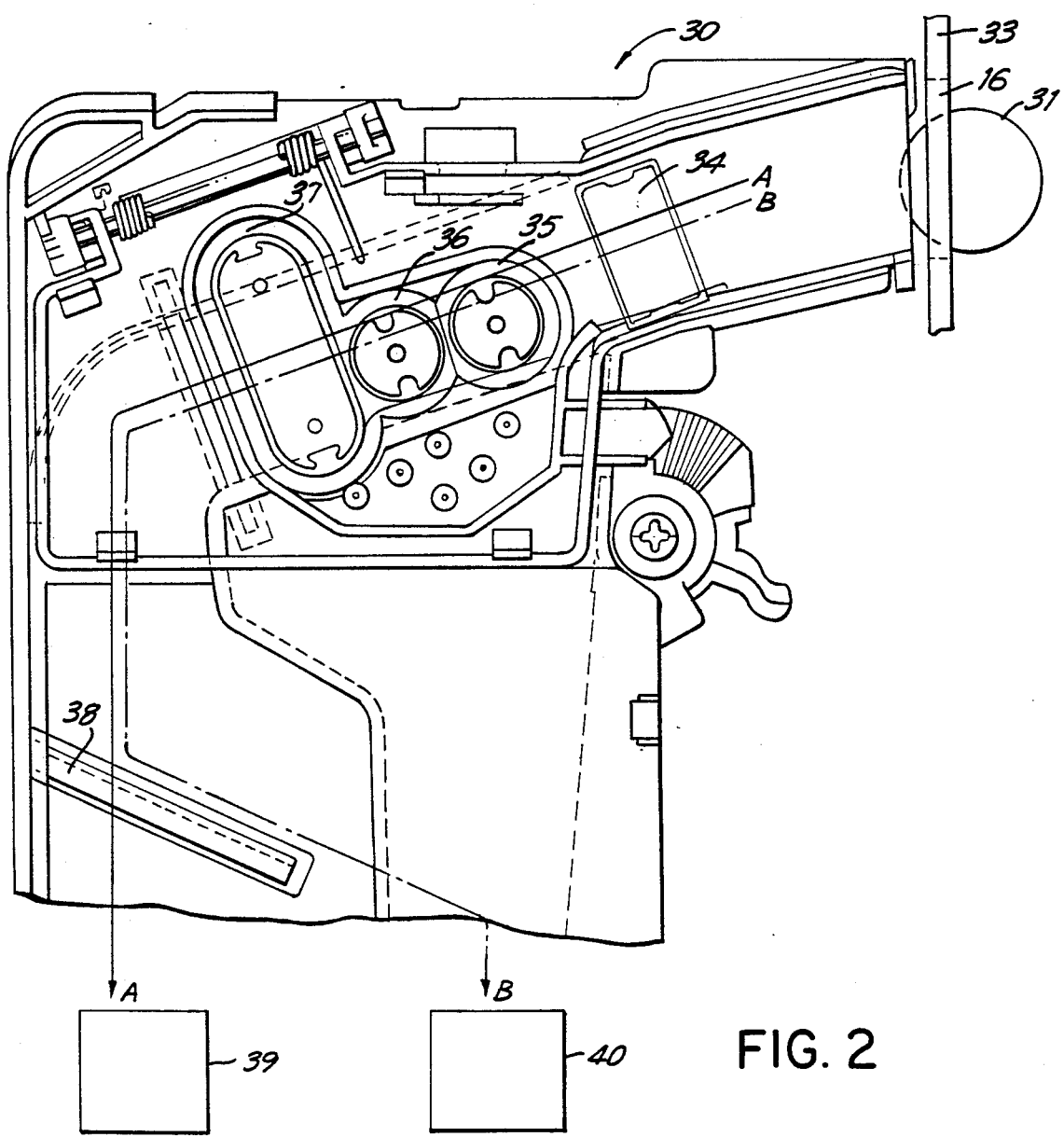
FIG. 2 illustrates the upper portion of an electronic coin acceptor suitable for use in the coin operated telephone of FIG. 1 and in conjunction with the low power control apparatus of the present invention.
Figure 14:
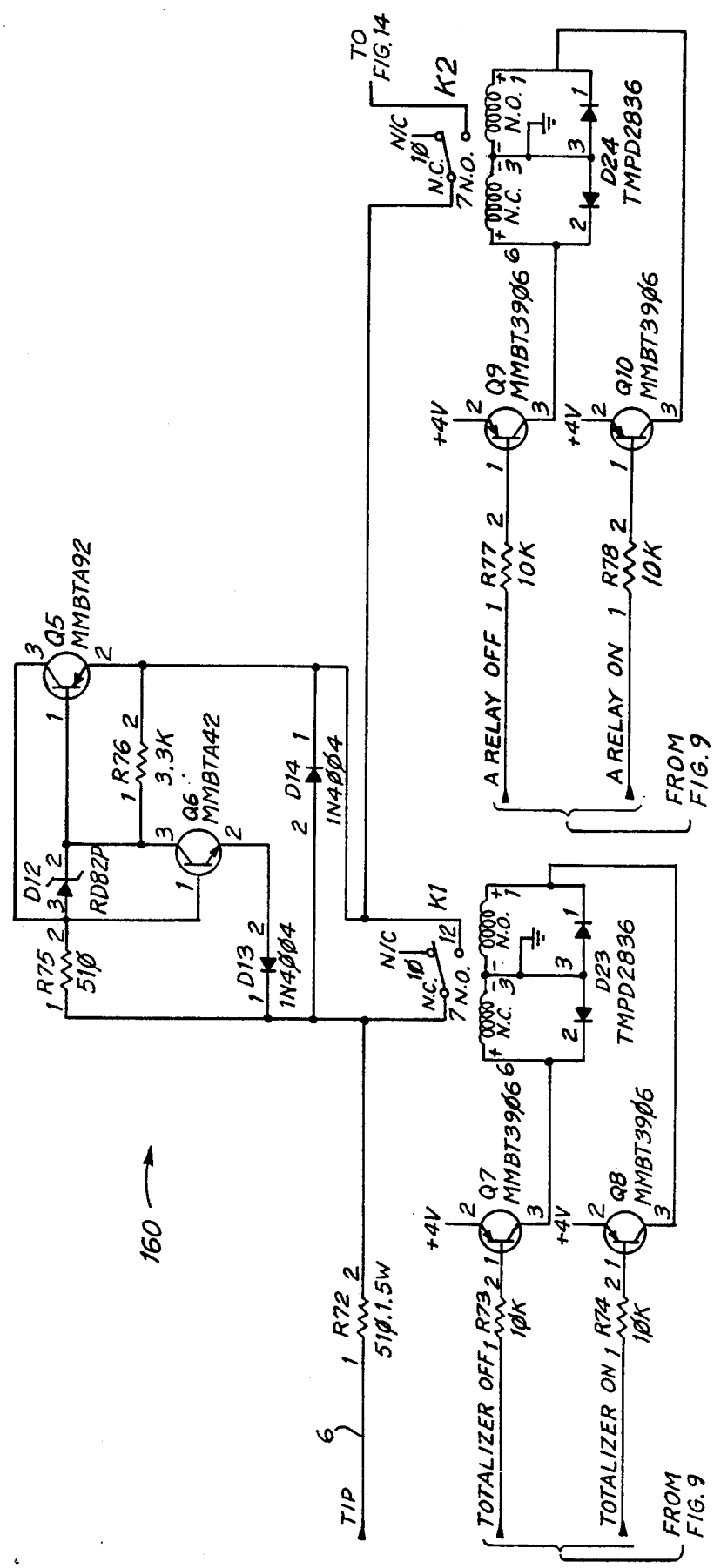
FIG. 14 and 14' illustrate a schematic diagram of a preferred ground lifting relay circuit.
Figure 19:
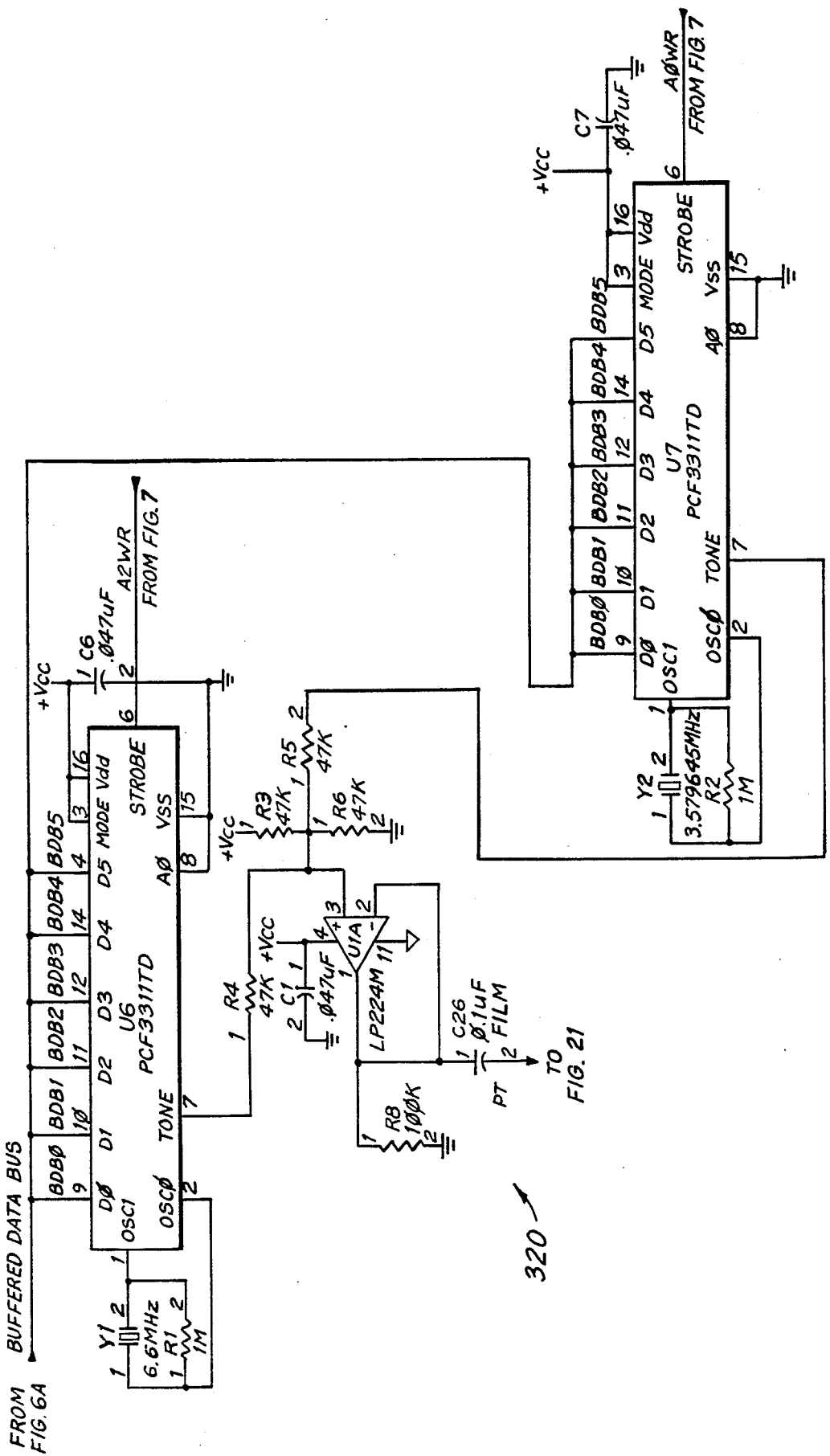
Figure 20:
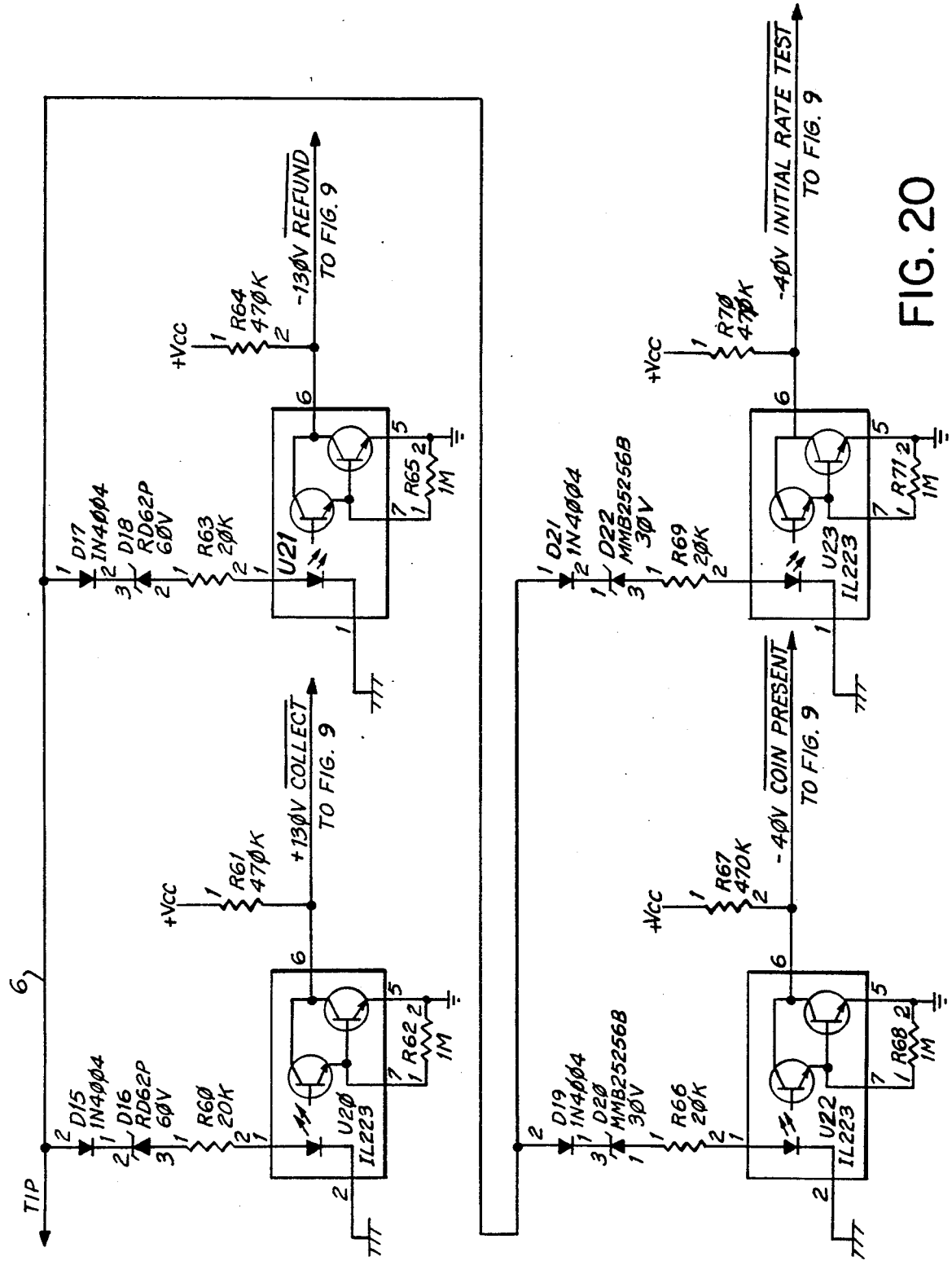
Figure 21:
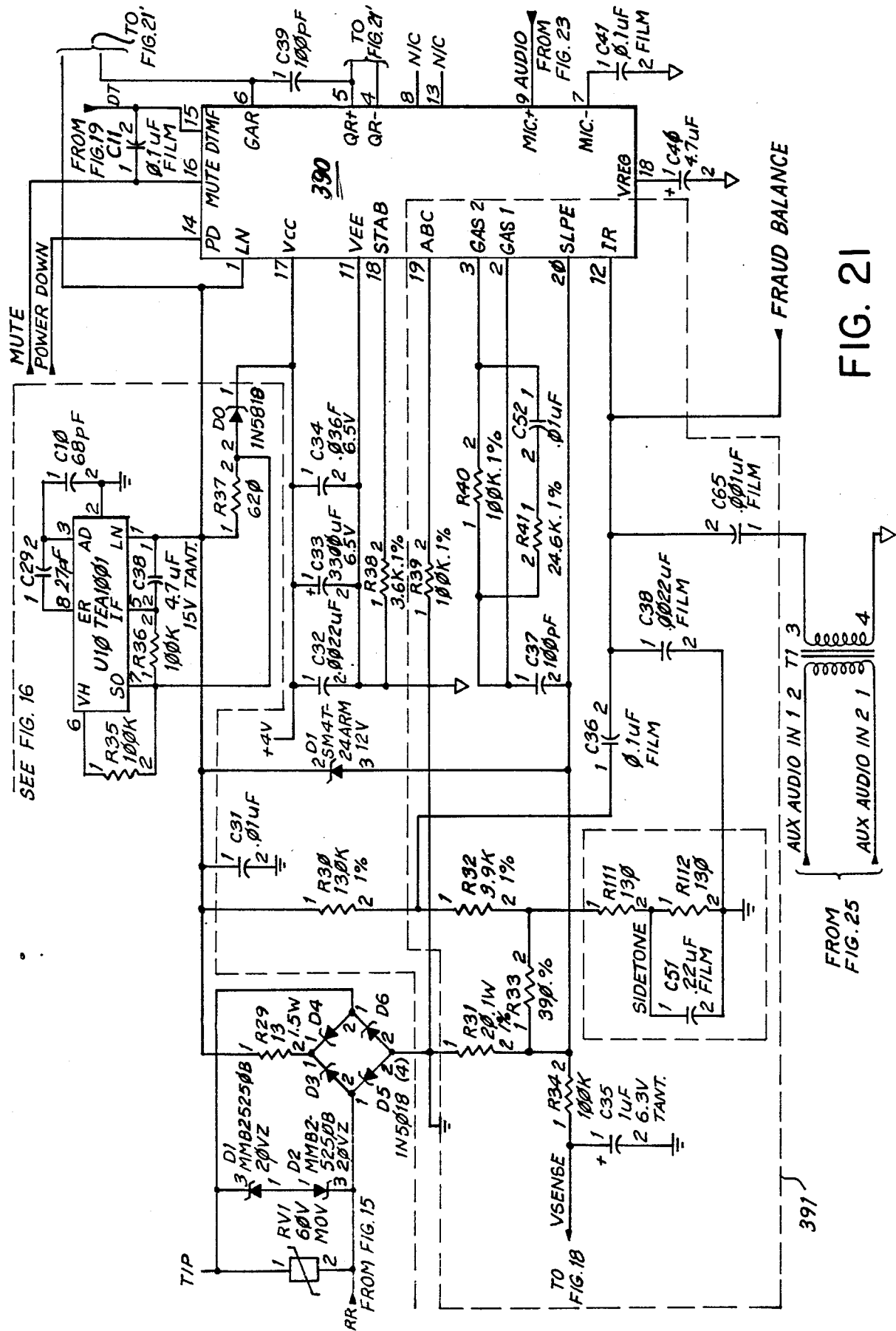
Figure 21:
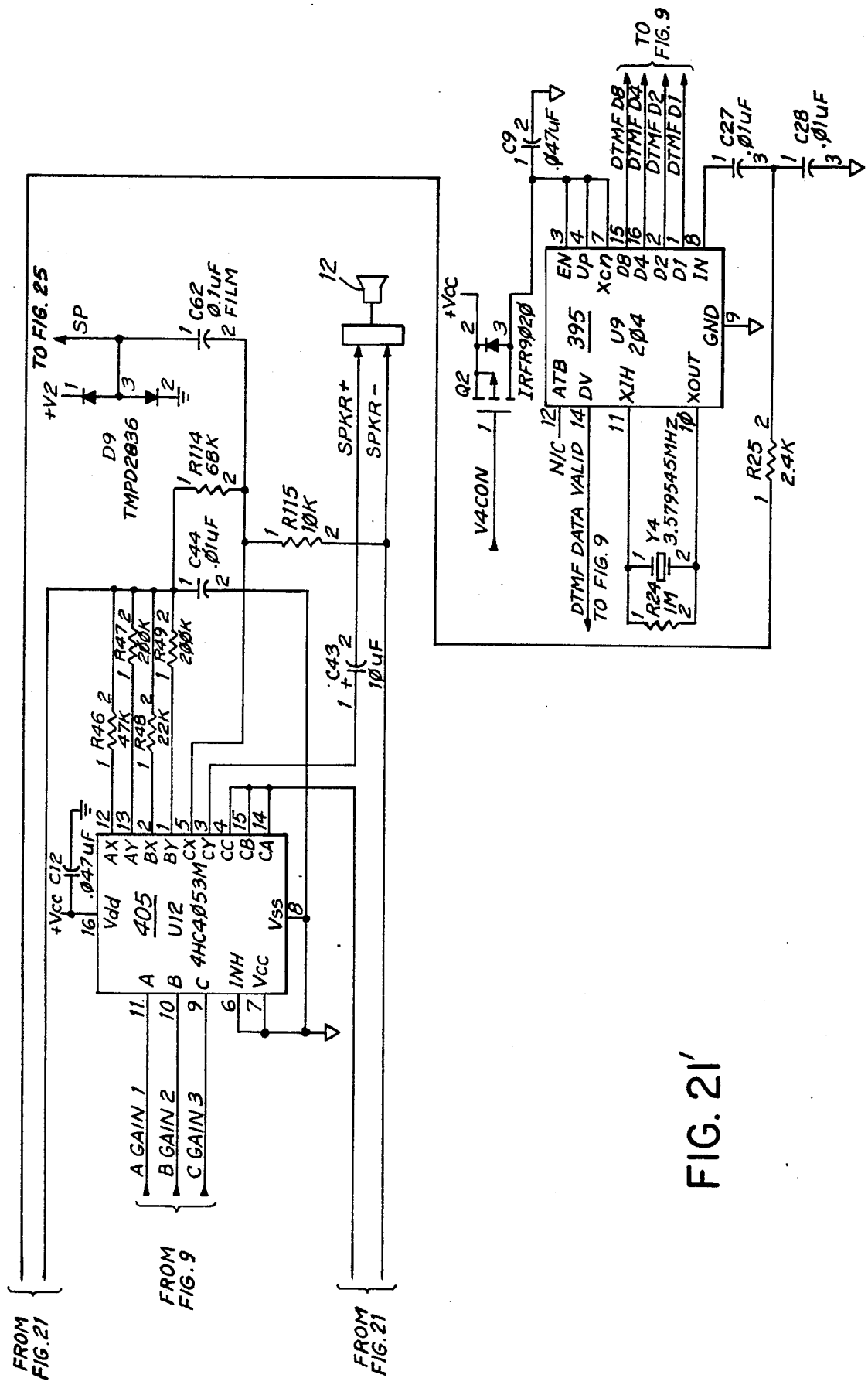
Figure 23:
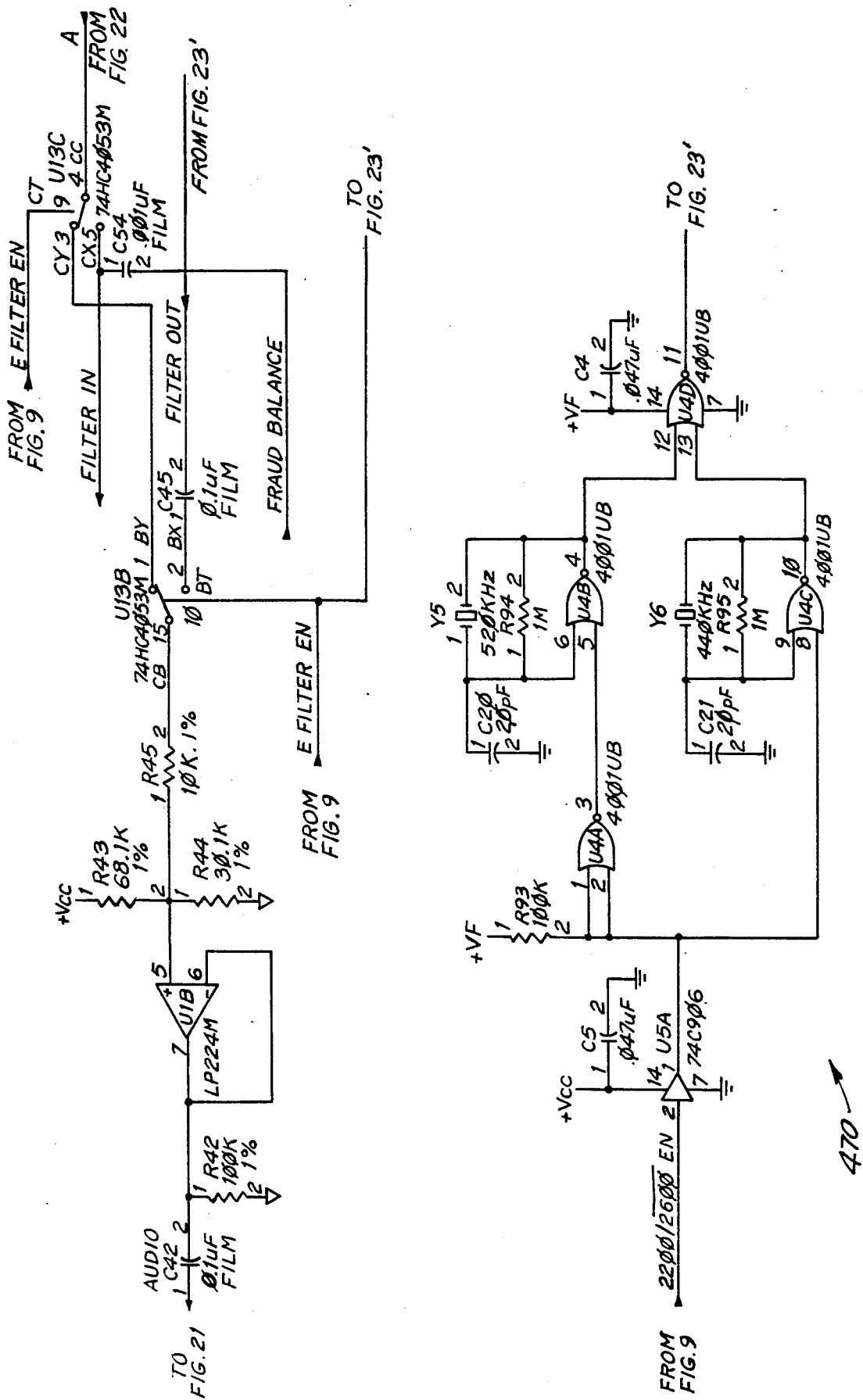
Figures 23, 24:
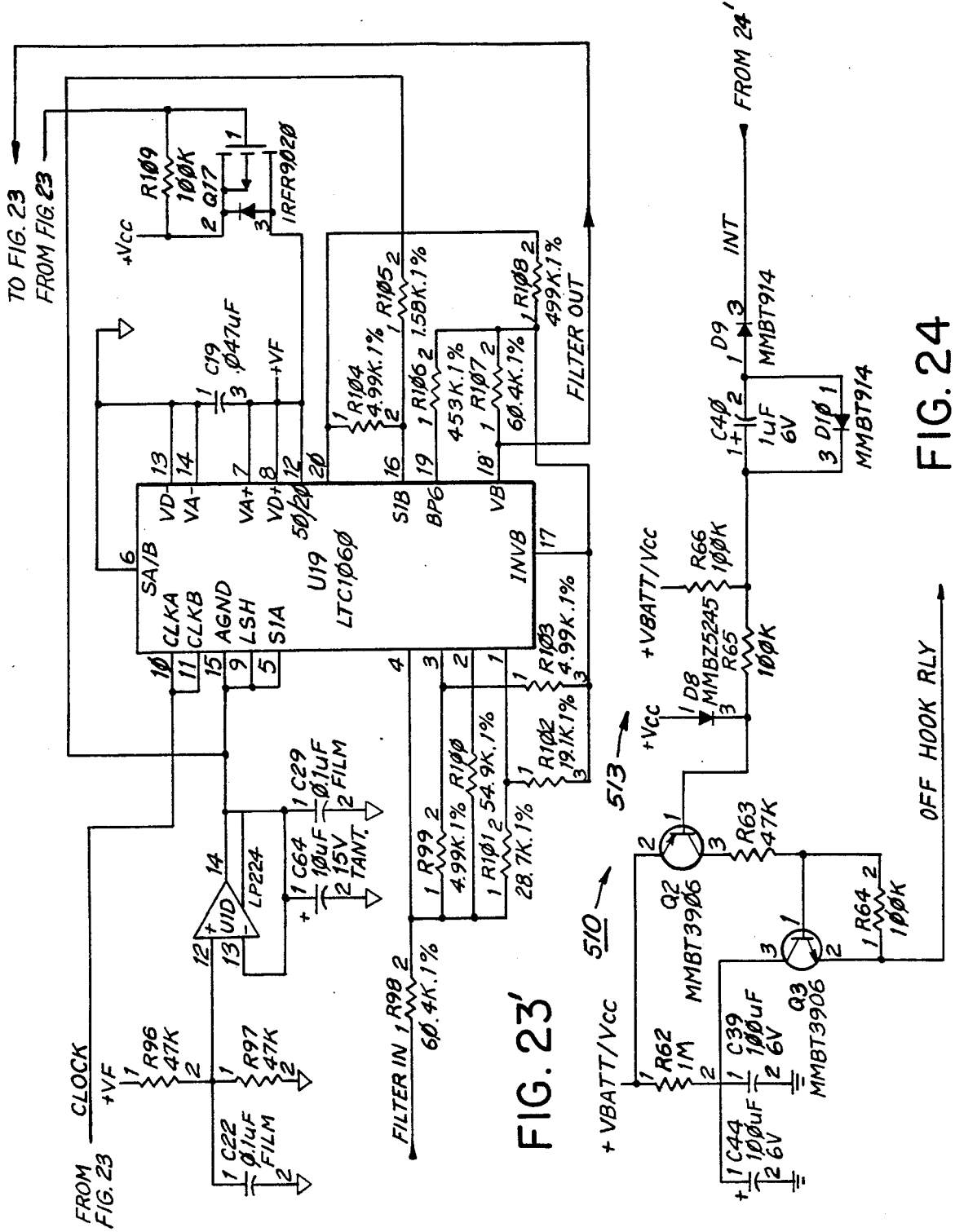
Figure 25:
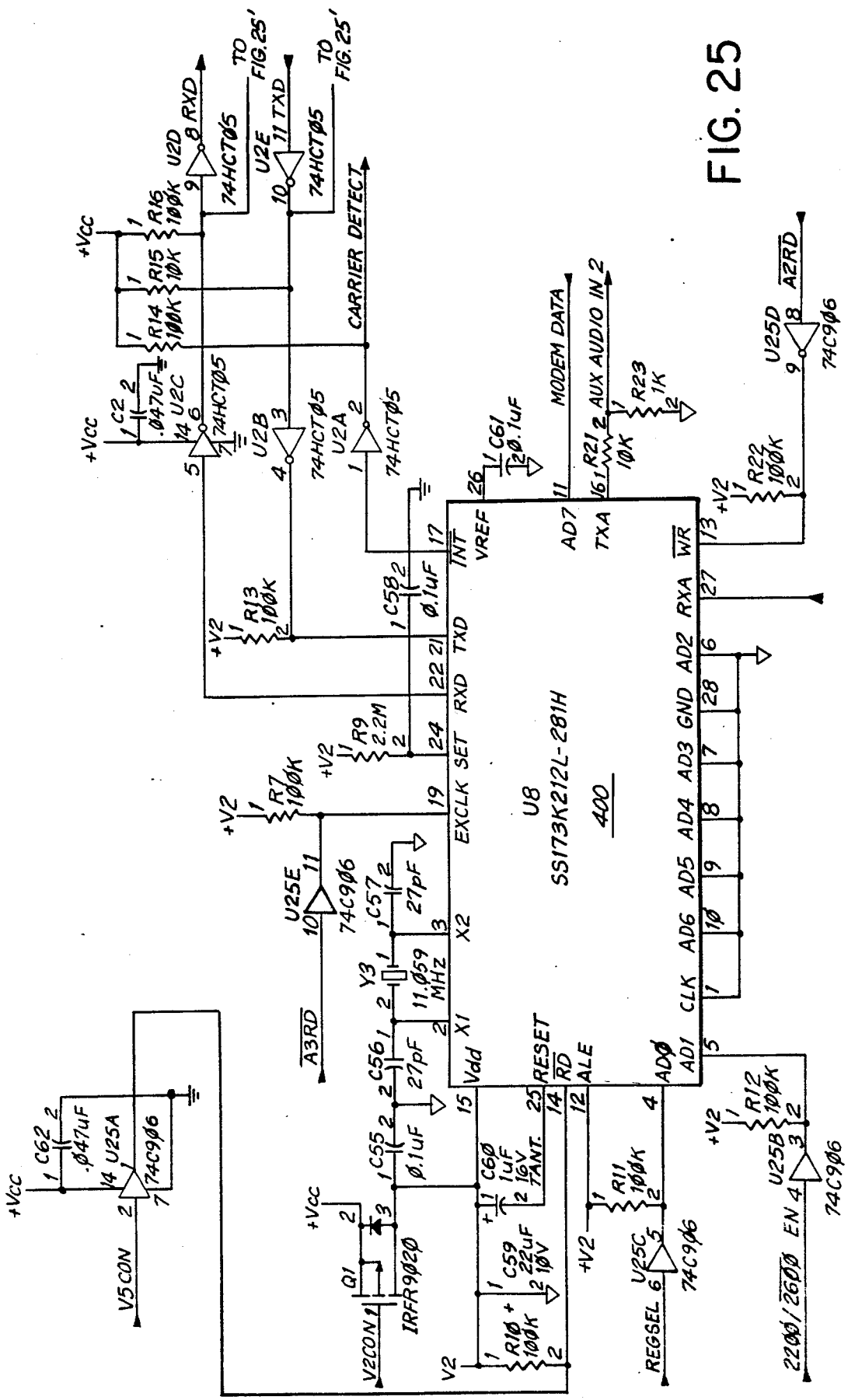

6A with coin test output signals from the electronic coin acceptor of FIG. 2 and a long loop detector circuit;

FIG. 19 is a schematic diagram of a preferred dual tone multi-frequency ("DTMF") generator circuit;

FIG. 20 is a schematic diagram of a preferred coin totalizer control circuit for controlling and interrogating a standard escrow bucket of a coin operated phone;

FIGS. 21 and 21' illustrate a schematic diagram of a preferred speech circuit;

FIG. 22 is a schematic diagram of a preferred handset removal detection circuit, and interface circuit for connecting the speech circuit of FIG. 21 to the filter circuits of FIG. 23;

FIGS. 23 and 23' illustrate a schematic diagram of preferred fraud prevention filter circuits;

FIGS. 24 and 14' illustrate a schematic diagram of a preferred monitor system circuit for monitoring system status inputs such as coinbox removal, door openings, and battery failure;

FIGS. 25 and 25' illustrate a schematic diagram of a preferred modem circuit; and FIG. 26 is a schematic diagram of a preferred ringing detect and ringing control circuit.

DETAILED DESCRIPTION

Figure 1:
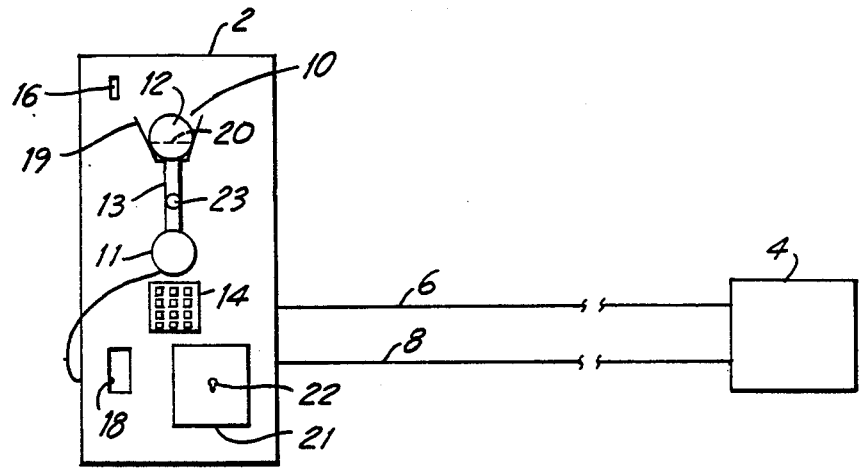
FIG. 1 illustrates a coin operated telephone connected to a central office by a two wire loop circuit.

FIG. 1 shows a coin operated phone 2 which is connected to a central office 4 by two wires, the phone lines, which are referred to as the tip 6 and ring 8. As shown in FIG. 1, phone 2 includes a handset 10 having a mouthpiece 11 and an earpiece 12, which are connected by a handle 13, a keypad 14, a coin slot 16, and a coin return slot 18. When not in use by a customer, the handset 10 sits in a cradle 19 depressing a spring loaded switch 20. When the handset 10 is in the position shown in FIG. 1, switch 20 is in its "on hook" position. When handset 10 is lifted out of cradle 19, switch 20 is no longer depressed and it is then in its "off hook" position. As is well known, the central office 4 applies various D.C. voltage amplitudes and polarities on the tip 6 and ring 8, from which the phone 2 generates its operational power when handset 10 is off-hook. As will be further described below, the varying DC voltages and an AC ringing voltage are interpreted by the phone 2 as providing operational commands for controlling its operation.

When handset 10 is on hook, the phone 2 draws essentially no power from the tip 6 or ring 8. As will be described further below, the phone 2 does, however, perform background testing and status monitoring in its standby state using a small amount of power from an internal battery.

To originate a call, a customer picks up handset 10 thereby releasing the switch 20 from its depressed position. The phone 2 enters its off-hook state, and begins to draw power from the tip 6 and ring 8 to process the call. Next, the customer inserts a sufficient number of coins into the coin slot 16 to cover the cost of the call and dials the number he wishes to call using keypad 14. The dialed number is transmitted to central office 4 which connects the call. The customer's money is collected by phone 2 when a collect signal from the central office 4 is received. The customer completes his call and then hangs up.

Turning to FIG. 2, the details of validation of a customer's coin or coins will be briefly discussed. FIG. 2 shows an electronic coin acceptor 30 suitable for use in conjunction with the low power controller of the present invention. Additional details of the operation of the preferred electronic coin mechanism for use in conjunction with the presentation are found in U.S. applications Ser. Nos. 188,038, 4,842,120 ("Jam Reducing Apparatus For Use In A Coin Operated Machine") and 199,138 ("Compact, Low Power Gate Apparatus For Coin Operated Machines") filed on Apr. 29, 1988 and May 26, 1988 respectively, and assigned to the assignee of the present invention. The disclosures of these two applications are incorporated by reference herein.

In FIG. 2, a customer's coin 31 is shown being inserted through coin slot 16 in front panel 33 of the phone 2. From the slot 16, coin 31 travels past a plurality of coin detectors and sensors 34, 35, 36 and 37. After the last sensor 37, coin 31 falls onto a gate 38 which directs the coin 31 either to a coin escrow bucket 39 or to a return chute 40 which directs the coin 31 to the coin return slot 18 where it can be retrieved by the customer. In traveling from slot 16 to the coin escrow bucket 39 or the coin return chute 40, coin 31 travels along either an accept path A shown as a solid line in FIG. 2, or along the reject path B shown as a dashed line in FIG. 2.

As will be discussed further below, each of the sensors 34, 35, 36 and 37 produces an electrical output signal which serves as an input to a processing element, which is preferably a microprocessor or microcomputer, which determines whether the coin is an acceptable one and its denomination. The microcontroller also produces output signals for controlling the position of the gate 38 so that gate 38 either directs the coin along path A or path B. The processing means also controls a power supply for supplying power to energize the gate 38. The processing of the electrical output signals from the sensors 34, 35, 36 and 37, the generation of gate control signals, and the control of the gate power supply are all electrical control functions performed by the low power controller of the present invention.

Figure 3:
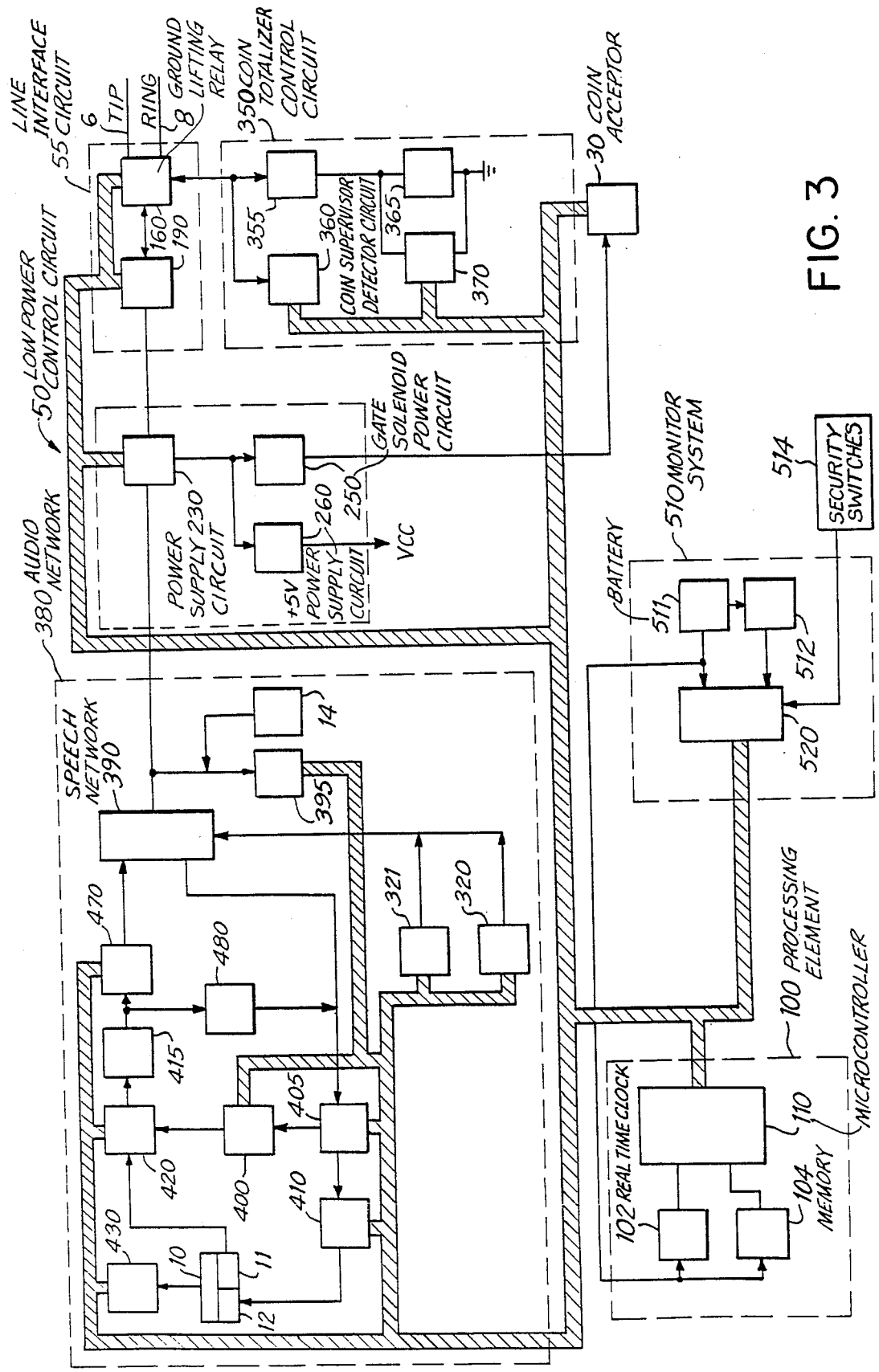
FIG. 3 is a block diagram of a low power controller in accordance with a preferred embodiment of the present invention.

Referring to FIG. 3 of the drawings, a block diagram of a low power control circuit 50 is illustrated. A line interface circuit 55 comprising a ground lifting relay circuit 160 and an off-hook detector circuit 190 connects the tip 6 and ring 8 lines from the central office 4 to a power supply circuit 230. The ground lifting relay circuit 160 also serves to selectively connect the tip and ring lines 6 and 8 to a coin totalizer control circuit 350 comprising a totalizer relay circuit 355, a coin supervisor detector circuit 360, a coin relay circuit 365 and a first coin bypass circuit 370. The interconnection of coin acceptor 30 of FIG. 2 which is responsible for accepting and validating coins deposited in coin slot 16 of FIG. 1 is also shown in FIG. 3. The coin acceptor 30 directs accepted coins to a standard coin telephone escrow bucket (not shown). This escrow bucket holds the coins in escrow until completion of the time period for which the coins were deposited and then collects them based on commands from the central office 4 and resulting control signals produced by totalizer control circuit 350. Coin acceptor 30 provides output signals to processing element 100 and in return receives operational control inputs from the processing element 100. Processing element 100 is shown in FIG. 3 as comprising a real time clock 102, memory 104 and a microcontroller 110.

Returning to the power supply circuit 230, that circuit is shown in FIG. 3 as having outputs connected to a gate solenoid power circuit 250, a +5 V power supply circuit 260, and an audio network 380. More specifically, power supply 230 provides power to a standard DTMF keypad which is presently preferred for use as the keypad 14 of FIG. 1, a DTMF decode circuit 395 and a speech network 390. With the exception of the limited functions powered from battery 511 which is part of a monitor system 510, the power supply circuit 230 in conjunction with control signals from processing element 100 controls the provision of all power for the low power controller 50. Power for the coin routing gate 38 of the coin acceptor 30 is provided through power supply 230, to the gate solenoid power supply 250, and from there to the gate 38. Power for all the digital electronic components requiring a 5 V DC supply is provided through supply 230 to the +5 V power supply 260. When the audio network 380 is powered up, it provides the phone 2 with the capability of transmitting and receiving speech and audio tone signals. These signals are transmitted and received as AC voltages on the tip 6 and ring 8 which are offset by the DC voltage applied by the central office 4. The processing element 100 through its single microcontroller 110 controls all the operations of phone 2 including audio network 380, coin acceptor 30, and power supply 230. As will be discussed further below, microcontroller 110 also records the status of the phone 2 and has the capability of initiating communications during the standby mode if that status warrants it.

Audio network 380 comprises a large number of interconnected blocks under the control of microcontroller 110. More specifically, the speech network 390 is connected to the DTMF decode circuit 395 and the DTMF keypad 14. Further, the speech network 390 is also connected to a coin tone generator 320, a DTMF generator 321, an audio balance circuit 480, a first switch 405, and notch filter circuit 470. The DTMF decode circuit 395, the coin tone generator 320 and the DTMF generator 321 are in turn connected to a modem circuit 400. Modem circuit 400 is also connected to the first switch 405 and a second switch 420. The notch filter circuit 470 is connected through a low pass filter (LPF) circuit 415 to the second switch 420. The second switch 420 is also connected to a microphone in the mouthpiece 11 of the handset 10. First switch 405 is connected to a level adjust circuit 410 which is in turn connected to an ear piece 12 of the handset 10. Handset 10 is further connected to a handset detector circuit 430. The DTMF decode circuit 395, the coin tone generator 320, the DTMF generator 321, the modem 400, the first and second switches 405 and 420, the level adjust 410, the handset detector 430, and the notch filter circuit 470 are all further connected to microcontroller 110 and the monitor system 510.

As its name implies, the monitor system 510 monitors the status of the phone 2. Typically monitor system 510 draws its power from power supply 230 which is energized by power from the tip 6 and ring 8 lines when the handset 10 is off-hook. Consequently, normal operational power for monitor circuit 520 is provided from the phone line.

Figure 4:
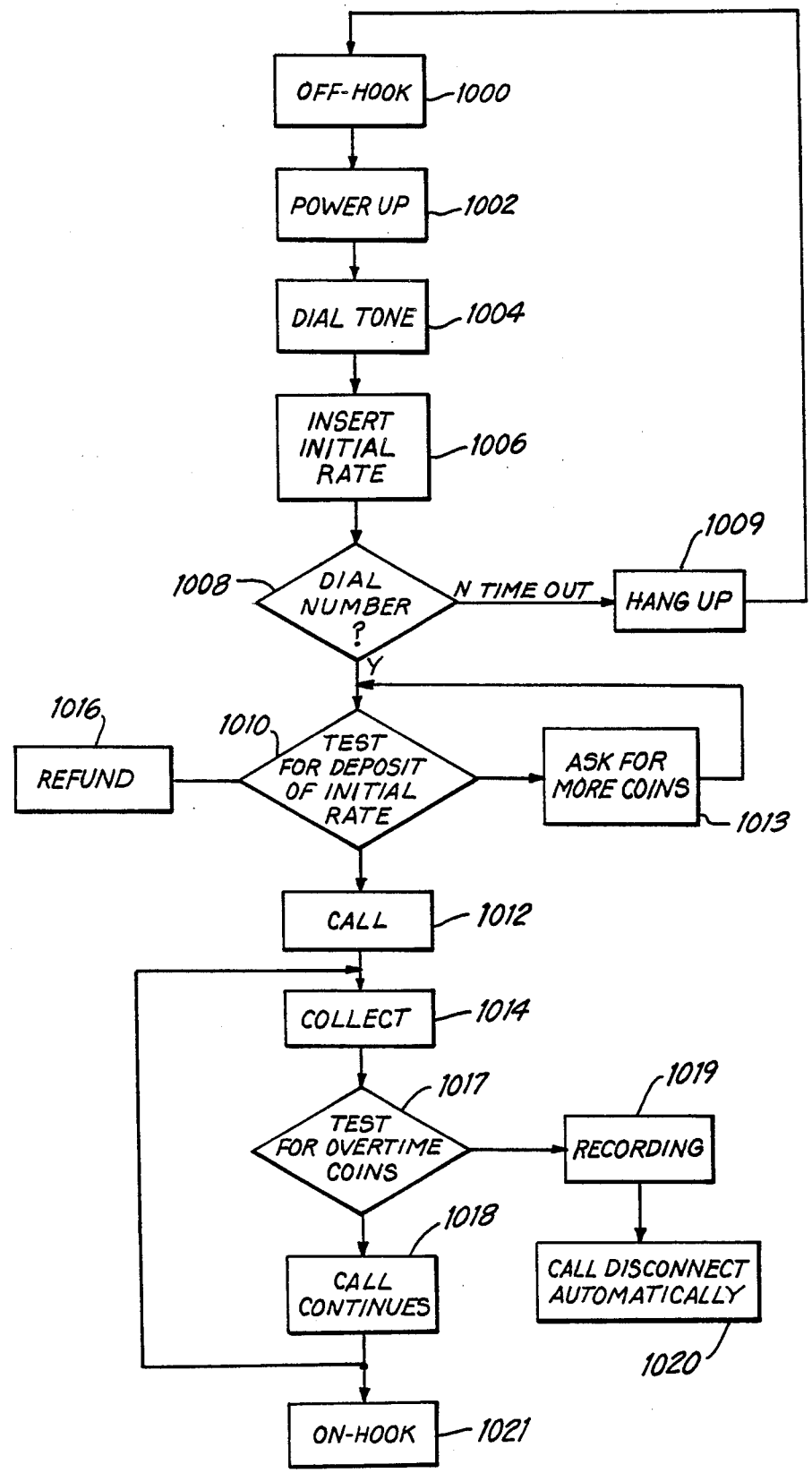
FIG. 4 is a flow chart illustrating the steps performed by the low power controller of FIG. 3 when processing a typical local call made with a coin operated telephone incorporating that controller.
Figure 5:
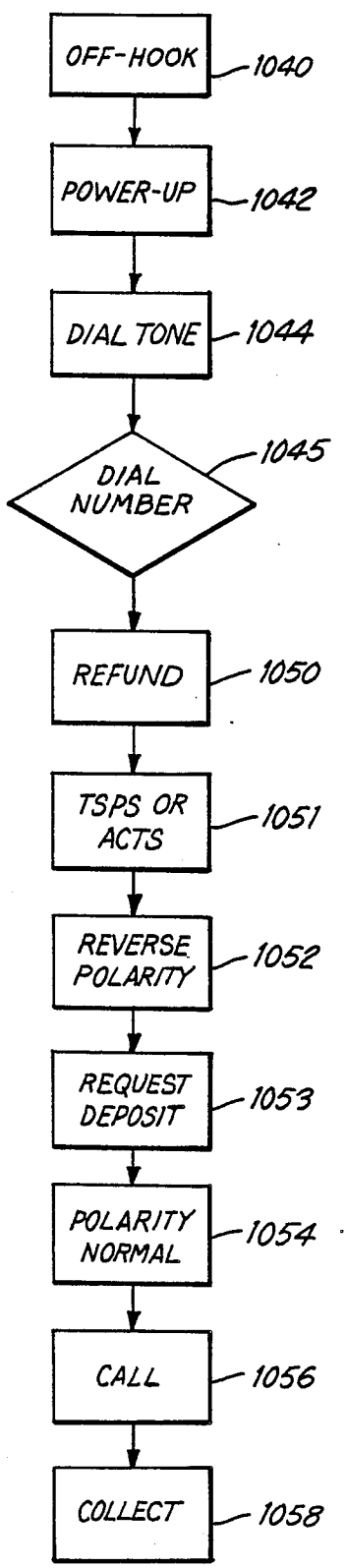
FIG. 5 is a second flow chart illustrating the steps performed by the low power controller of FIG. 3 when processing a long distance call.

Having now introduced the various blocks of low power controller 50, the operation of those blocks will be discussed in the context of the flowcharts of FIGS. 4 and 5. FIG. 4 is a flowchart of the operation of controller 50 for a local call at a fixed initial rate of 25 cents, and FIG. 5 is a second flowchart of the operation of controller 50 for a long distance call costing in excess of the fixed initial rate.

Referring to FIG. 4 of the drawings, the steps performed by the phone 2 when processing an initial rate call are illustrated. An initial rate call is one which requires the deposit of sufficient coins in the slot 16 to satisfy the initial rate for a local call from the phone 2. This rate is programmed into memory in the phone 2 and may vary with the location of the installation of the phone 2.

Prior to step 1000, in which control 50 senses that the handset 10 is off-hook, the phone 2 is in the standby mode, performing background testing. The ground lifting relay circuit 160 connects the tip 6 and ring 8 lines to the totalizer control circuit 350 applying −48 V DC thereto. The power supply circuit 230 is effectively isolated from tip 6 and ring 8 so that the phone 2 draws less than 1 microampere (uA) of power.

Phone 2 enters the off-hook state in step 1000, when the handset 10 is removed from its cradle 19 by a customer desiring to make call. Switch 20 is thereby released from its depressed position. With the handset off-hook, ground lifting relay circuit 160 connects tip and ring voltage through the switch hook function circuit 190 to power supply 230. The new position of the switch 20 is sensed by the switch hook function circuit 190 which tells the microcontroller 230 of the new position over a control line. Once charged, power supply 110 provides power in step 1002 to microcontroller 110 which leaves its standby state and performs a sequence of wakeup diagnostics. For example, microcontroller 110 interrogates handset detector 430 to learn if the handset 10 has been torn off, determines if audio signals are being produced by the DTMF keypad 14, and strobes coin detector 34 of coin acceptor 30 to determine if a coin is present or if the coin entryway has been jammed.

The controller 50 is designed to operate with a phone 2 which operates in a dial tone first (DTF) mode. Consequently, in step 1004, central office 4 transmits an electrical signal on the tip 6 and ring 8 which is offset from the DC voltage, so as to produce a dial tone in the earpiece 12.

This dial tone signal passes through ground lifting relay 160, the off-hook detector circuit 190 and the audio network 380 to the earpiece 12. Assuming that the customer is not making a free call such as dialing an emergency number, for example 911, the next step 1006 of the flowchart of FIG. 4 is to deposit the initial rate for the call, for example 25 cents. When the customer inserts a genuine 25 cents coin through coin slot 16 of coin mechanism 30, the coin first passes detector sensor 34 whose output signal tells microcontroller 110 that a coin or object is present. The sensors 35, 36, and 37 test the coin's validity and denomination. Since in our example, a genuine 25 cents coin was inserted, microcontroller 110 determines that an acceptable 25 cents coin has been inserted and instructs gate 38 to direct that coin to the coin escrow bucket 39.

A temporary register stores the number of coins accepted. A register for each possible coin denomination is provided to store a running total of the number of coins of each denomination deposited. Another register is provided to store the total number of coins deposited.

The acceptance of the coins is conditioned on there being sufficient power to power gate 38. This conditional acceptance provides the advantage of not causing a jam in the coin acceptor in cases where there is insufficient power and thereby avoids problems with future use of the phone 2. It also avoids the loss of coins by a particular customer thereby avoiding customer frustration and ill will. Power to the gate 38 is provided by rapidly charging a capacitor in the gate solenoid power supply 250. Before the decision to accept a coin is made by microcontroller 110, the voltage across the capacitor is checked. If insufficient power is sensed, the coin is returned to the customer by routing the coin to coin return slot 18.

Meanwhile, the dial tone continues until a number is entered on the key pad 14 or until the central office 4 determines that no number has been entered for 20 seconds. This determination is made at step 1008. If a number is not dialed within the allotted time, the central office 4, at step 1009 instructs the caller to hang up to reacquire the dial tone. If the caller hangs up, phone 2 returns to the standby mode. Then, if the caller again picks up the handset 12, the cycle begins again at step 1000.

At step 1008, the caller dials a number using DTMF keypad 14, the keypad both monitors the numbers dialed and generates a dual tone signal for each number depressed. These AC signals are offset from the DC voltage and are transmitted through the tip 6 and ring 8 lines. The DTMF signals inform the central office 4 of the desired telephone number.

During the dialing of the number, the DTMF decode circuit 395 monitors the DTMF signals generated by the DTMF keypad 14. As part of a call accounting package, the called number is stored for each call.

Once a valid number has been entered on the keypad 14, the central office 4 in step 1010 tests the totalizer relay 355 to see if the correct deposit of the initial rate for a local call has been made. For a free call, the central office 4 returns any deposited coins. A valid number may be as short as one digit, such as "zero" for operator, or as long as eleven digits. The central office 4 tests the phone 2 for deposit of the initial rate by momentarily removing $-48$ V from the ring 8 and applying it to tip 6. Electronic sensors in the power supply 230 sense the momentary interruption of voltage and inform the microcontroller 110 of this interruption. The microcontroller 110 then polls the switch hook function circuit 190 to discover why power to the supply 230 was interrupted. Two reasons are possible. First, the handset 10 could have been returned to its hook position by the caller. Second, the central office 4 could be performing a test. Switch hook function circuit 190 senses the position of the switch 20 and informs the microcontroller 110 whether the handset 10 is on- or off-hook. From this data, microcontroller 110 can readily determine the reason for the absence of voltage.

Where a central office test is being made, microcontroller 110 causes the ground lifting relay circuit 160 to switch to connect the tip 6 and ring 8 to the totalizer control circuit 350. With the central office 4, applying 48 volts DC on the tip 6 and grounding the ring 8, coin supervisor 360 senses the voltage polarity and level on the tip 6 as referenced to ground and determines that the central office 4 is testing for the correct initial deposit.

If the correct amount has been deposited, a contact will have been closed in the totalizer relay circuit 355. The coin supervisor 360, if it senses this closed contact causes an electrical signal to be placed on the tip 6 indicative of the deposit of the initial rate. No such signal is generated if the contact is open.

The ground lifting relay circuit 160 reconnects power through the switch hook function detector 190 to power supply 230. During the initial rate test, power supply 230 was not energized. To meet the power demands of the microcontroller 110 during this time, a capacitor with a charge stored while the power supply 230 was previously energized, is discharged.

Where the initial rate test establishes that an adequate deposit has been made, the call is placed in step 1012. Otherwise, in step 1013, a recording instructs the customer to reinitiate the call with the proper initial deposit.

After the called third party answers, the central office 4 initiates timing of the call. The call continues until the initial period ends. Then, the central office 4 causes, in step 1014, the phone 2 to collect the coins in the escrow bucket 39 causing them to be delivered to a coinbox (not shown) which is located behind the coinbox door 21 of FIG. 1. Coins are collected from the coinbox by using a key in keyhole 22 of FIG. 1 to open the coinbox door. Preferably, the opening of the coinbox door 21 actuates a status switch which is monitored by the controller 50.

To collect coins, central office 4 removes the voltage at the tip 6 and ring 8, and then ties the ring 8 to tip 6 and applies $+130$ volts DC relative to earth ground. The power supply circuit 230 senses the interruption in voltage and informs the microcontroller 110, which causes the ground lifting relay circuit 160 to connect the 130 V signal to the coin relay 365. The coin supervisor 360 senses this voltage and as a result causes the collection of the coins.

If the call had not been placed after the initial rate was deposited, the central office 4 would have caused the phone 2 to refund the coins in step 1016. This refund would be made by removing the voltage on the tip 6 and ring 8, and then tying the ring 8 to the tip 6 and applying $-130$ volts DC relative to earth ground.

Prior to expiration of the initial rate period, the customer is instructed to deposit additional coins for overtime usage in order to continue the call. The central office 4, sensing that the call is continuing after a predetermined time, tests for the presence of the necessary overtime usage coins in step 1017. As was the case in testing for the initial rate deposit, the central office 4 applies $+48$ Volts DC to the tip 6 and grounds the ring 8 to test for the presence of the necessary deposit escrowed in the coin escrow bucket 39 by testing coin relay 365. The coin supervisor 360 senses this test and replies with the result. If an adequate deposit has been made, the call continues in step 1017, otherwise a recording or an operator is connected which makes a request for the overtime deposit in step 1019. Finally, if the overtime deposit is not made, the call is disconnected in step 1020.

Upon completion or abandonment of a call, the customer hangs up the handset 10 returning it to the on-hook position. The ground lifting relay circuit 160 connects the tip and ring lines to the coin relay 365, as discussed previously, and the central office 4 interrupts voltage on the tip 6 and ring 8 and applies a collect ( $+130$ volts DC) or a refund ($-130$ volts DC) voltage with respect to ground to the tip 6. The phone 2 either collects or refunds the coins as instructed, and then returns to the standby mode.

During the steps illustrated in FIG. 4, the audio network 380 provides an interface for audio signals between the tip and ring lines and the mouthpiece 11 and earpiece 12 in the handset 10. The speech network 380 also limits noise to the earpiece 12 during the sequence described above in connection with discussion of power up step 1002.

Audio signals from the central office 4, representative of speech are imposed on the tip 6 and ring 8 offset from any DC voltage present. Those signals propagate through the ground lifting relay circuit 160 and the switch hook function sensor 190. The sensor 190 passes the signals to the power supply 230 and then to the audio network 380. The audio network 380 processes the signals providing isolation between the mouthpiece 11 and earpiece 12. The processed signals go through the first switch 405, and the level adjust circuit 410 to the earpiece 12 where the signals are converted to audible signals. The level adjust circuit 410 provides four levels of audio signals which can be selected by a switch 23 on the handset 10 which causes a circuit in the handset detector circuit 430 to have differing resistances according to the number of actuations of the switch 23. The microcontroller 110 controls the level adjust circuit according to the resistance in the handset detector circuit 430, thereby controlling the signal level in the earpiece 12.

During voice transmission from the phone 2 to the central office 4, a caller talks into the microphone of mouthpiece 11. The microphone converts the voice signal into electrical signals which are passed through the second switch 420 to the low pass filter and preamplifier circuit 415. The second switch 420 selects between the microphone and the modem 400. The signal from the circuit 415 then passes through a 2600 Hz notch filter in filter circuit 470. The 2600 Hz filter may be selectively switched in and out of the circuit under the control of the microcontroller 110. The filtered signal from the output of filter circuit 470 is processed by the speech network 390 and output to the power supply 230 where it is offset from the D.C. voltages present in that circuit. The offset signal is passed through the switch hook function circuit sensor 190, through the ground lifting relay circuit 160 to the phone lines.

A fraud audio balance circuit 480 is provided to prevent detection of the 2600 Hz notch filter by one attempting to commit fraud with a tone generator. Filter detection is possible because the speech network 390 provides side tones, which feedback some of the electrical signals generated from the microphone into the earpiece 12 to provide a natural volume reference for the caller. When the 2600 Hz filter is inserted into the transmission path, in the absence of balance circuit 480 it is possible to detect its presence by a change in what is heard in the earpiece 12. This change occurs because the fraudulent tones are filtered out and not heard in earpiece 12. The fraud audio balance circuit 480 provides an alternate audio path so that the fraudulently generated tones are heard in earpiece 12, and consequently, a person cannot immediately detect the presence of the 2600 Hz notch filter.

Referring to FIG. 5 of the drawings, the steps performed by the phone 2 when a call requiring more than the initial rate is placed, are illustrated. The phone 2 follows the same procedures in steps 1040, 1042, 1044 and 1048 as in steps 1000, 1002, 1004 and 1008, respectively of FIG. 4. At the end of step 1048 when a valid number has been dialed, the central office 4 determines that the number dialed requires more than the initial rate and in step 1050, refunds any coins which have been deposited in the phone 2. The refund procedure is the same as described in step 1016 of FIG. 4.

The call is then connected to either a Traffic Service Position System (TSPS) trunk or an Automatic Computerized Telephone System (ACTS) trunk in step 1051.

In step 1052, the central office 4 reverses the polarity on the tip 6 and ring 8. The power supply circuit 230 senses this reversal of polarity and informs the microcontroller 110. TSPS or an ACTS trunk is connected to the phone 2 for a long distance call. The microcontroller 110 then disables the DTMF key pad 14, and disconnects the 2600 Hz filter. It enables the coin tone generator 320 and connects a second filter, a 2200 Hz notch filter, found in the filter circuit 470. The 2200 Hz filter which is then in the line with the microphone prevents any 2200 Hz signal from reaching the tip 6 and ring 8 from the microphone, thereby preventing the fraudulent practice of generating tones at the mouthpiece 11 to simulate the tones generated by the coin tone generator 320.

In step 1053, the TSPS operator requests the deposit required for the initial call period for the number dialed. Coin tone generator 320 generates a unique dual tone signal for each denomination of coin deposited in the coin slot 16, one of the tones for each denomination is 2200 Hz.

The TSPS or the ACTS monitors the tones generated by the coin tone generator 320 and determines the amount of coins entered. Once the TSPS or the ACTS has determined that sufficient coins have been deposited, the polarity on the tip 6 and ring 8 is reversed back to normal in step 1054. The microcontroller 110 disconnects the 2200 Hz notch filter and reconnects the 2600 Hz filter. The call duration is timed by the TSPS or the ACTS. The call continues in step 1056 until the initial charge period is completed. Then, in step 1058, the coins are collected by momentarily removing voltage at the tip 6 and ring 8 and then applying a +130 Volt DC pulse, as previously described.

During the standby mode, the phone 2 performs a self diagnostics routine. The monitor system 510 examines the status of the phone 2 by monitoring the real time clock 102, the battery level of battery 511 and a number of security switches represented by block 514 of FIG. 3. The security switches include one to indicate removal of an upper housing of phone 2, a second to indicate the removal of the coinbox, and a third that detects the opening of the coinbox door 21.

When necessary, the monitor system 510 initiates an internally generated off-hook condition, so that the phone 2 may be powered up to place a phone call without the handset being physically off-hook. Upon power up, the microcontroller 110 interrogates the monitor system to determine what event generated the power up. The microcontroller 110 then causes the first and second switches 405 and 420 respectively to switch the handset 10 out of the audio network 380 and to the modem 400 in line. The microcontroller 110 then controls the modem 400 to transfer data from phone 2 to the central office 4.

The power management in the phone 2 is important to allow a large number of functions to be formed utilizing power only from the tip 6 and ring 8. At the minimum line current, only 23 mA of current can be drawn from the phone lines, so that any electronic implementation of a coin operated phone that uses power from these lines is normally severely limited by this small loop current. Controller 50 overcomes these limitations by implementing a number of energy management hardware and software techniques.

Controller 50 uses low power devices where available. Interfacing is done through open drain CMOS devices. All parts of the circuit peripherals can be turned off when not required to conserve energy. All mutually exclusive events or processes are locked out by hardware and software. The microcontroller 110 monitors the total power available and includes means to direct the total available line power to a particular function. Upon first receiving power from the tip 6 and ring 8 upon power up, power is allocated to rapidly charge energy storage devices, in particular capacitors. All the power from the tip 6 and ring 8 charge these capacitors for a short period of time. Thereafter, individual circuits are powered as power is needed. After a brief initial charging period, the microcontroller 110 and audio network 380 are powered. The DTMF decoder 395 and the DTMF generator 320 are powered only when needed. Upon detection of the depression of a button on the DTMF key pad 14, power is switched to these circuits. The coin acceptor 30 draws a small amount of current all the time, in the off-hook state. Its detector sensor 34 constantly monitors a coin chute, so that when a coin is inserted into coin acceptor 30 it is promptly detected and, then the remaining circuitry of coin acceptor 30 is powered up. Upon coin detection, a capacitor in gate solenoid power supply 250 is rapidly charged. The speech network 380 is momentarily powered down during coin acceptance as it is not needed. When the speech network 380 is required to generate coin tones, it is powered up and the coin acceptor 30 is powered down. Another power control feature is that the power supply 250 for the gate solenoid is monitored. If the voltage is not high enough, coin acceptor 30 will not accept coins. This is particularly useful where the phone 2 is located at the end of a long loop. In such cases, the rate of coin acceptance may have to be slowed to allow time for the gate solenoid power supply 250 to recharge. Under marginal conditions, coins will not be accepted.

Potentially high power utilization devices within controller 50 are the DTMF decoder 395, the DTMF keypad 14, the coin acceptor 30, the speech circuit 390, the modem 400, a service display (not shown) and the filter 470. The DTMF keypad 14 generates a pair of tones when one of its buttons is pressed. Circuitry is provided to disable the keypad 14 after a half-second of generation of tones, thereby limiting the maximum power drawn by the keypad 14, and preventing intentional and unintentional power dissipation by holding down a button for an extended period of time. The modem 400 is only powered up during a required modem call. The service display is only powered up during the service mode in which a serviceman is repairing or checking the phone 2. The filter circuit 470 may also be powered down when not in use. The monitor system 510 provides background checking for the status of phone 2. It is powered by a battery 511 so it can continuously monitor the system. It monitors security switches, which include a switch for the upper housing, a switch indicating that the coinbox has been removed, and a switch indicating that the coinbox door 21 has been removed. It also monitors the internal battery level, the real time clock 102 and maintains memory 104 if the power lines are disconnected.

DETAILED CIRCUIT DESCRIPTIONS

The controller of FIG. 3 for a coin operated phone, in accordance with the preferred embodiment, is constructed on two printed circuit boards. The circuit on these two boards includes the line interface circuit 55, the audio network 380, the processing element 100, and the power supply 230. The electronic coin acceptor 350 functions are implemented on a separate printed circuit board.

Figure 6A:
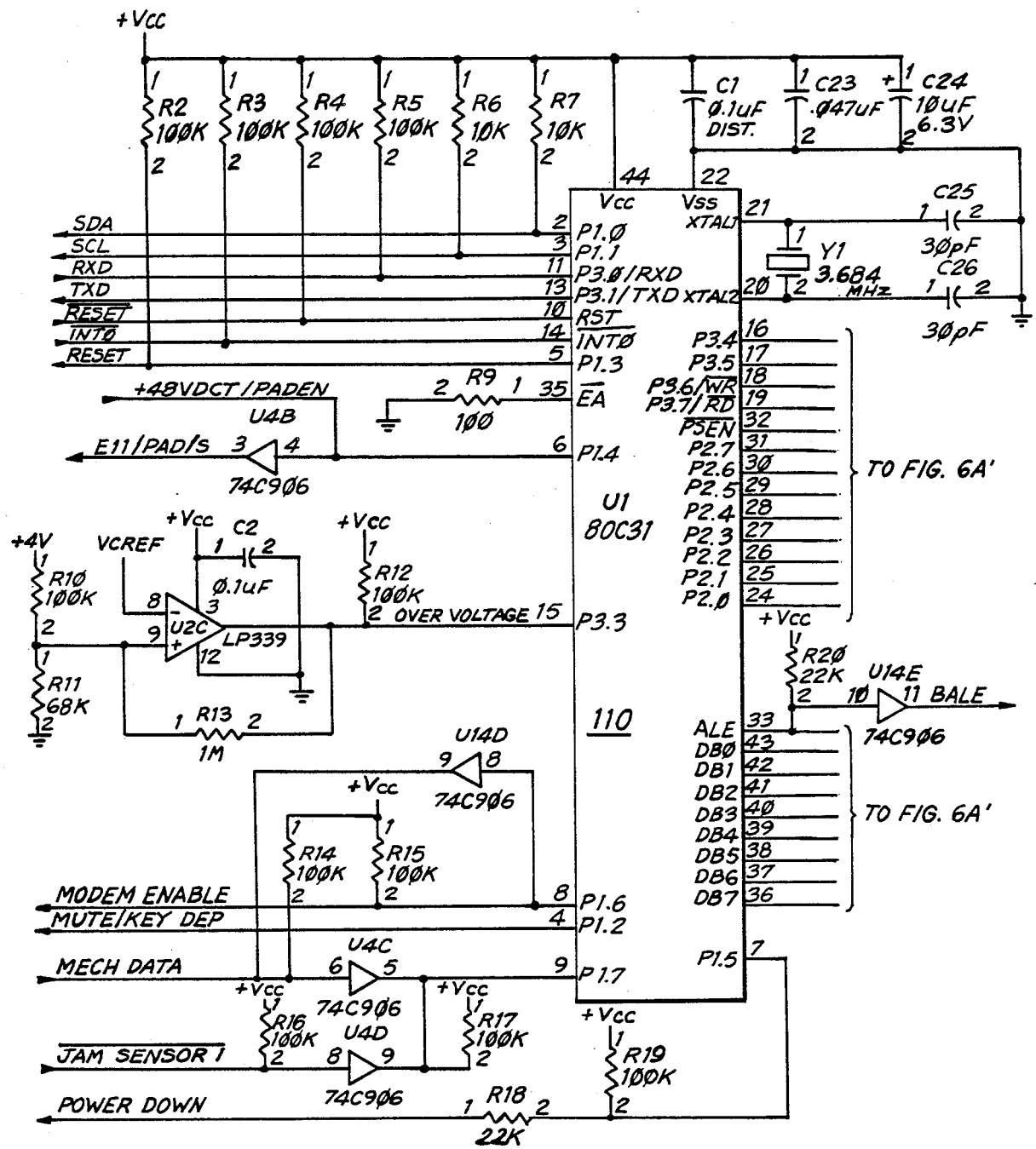
FIGS. 6–13 are schematic drawings illustrating portions of the preferred embodiment of a microprocessor based low power coin operated telephone controller circuit according to the present invention.
Figure 6A:
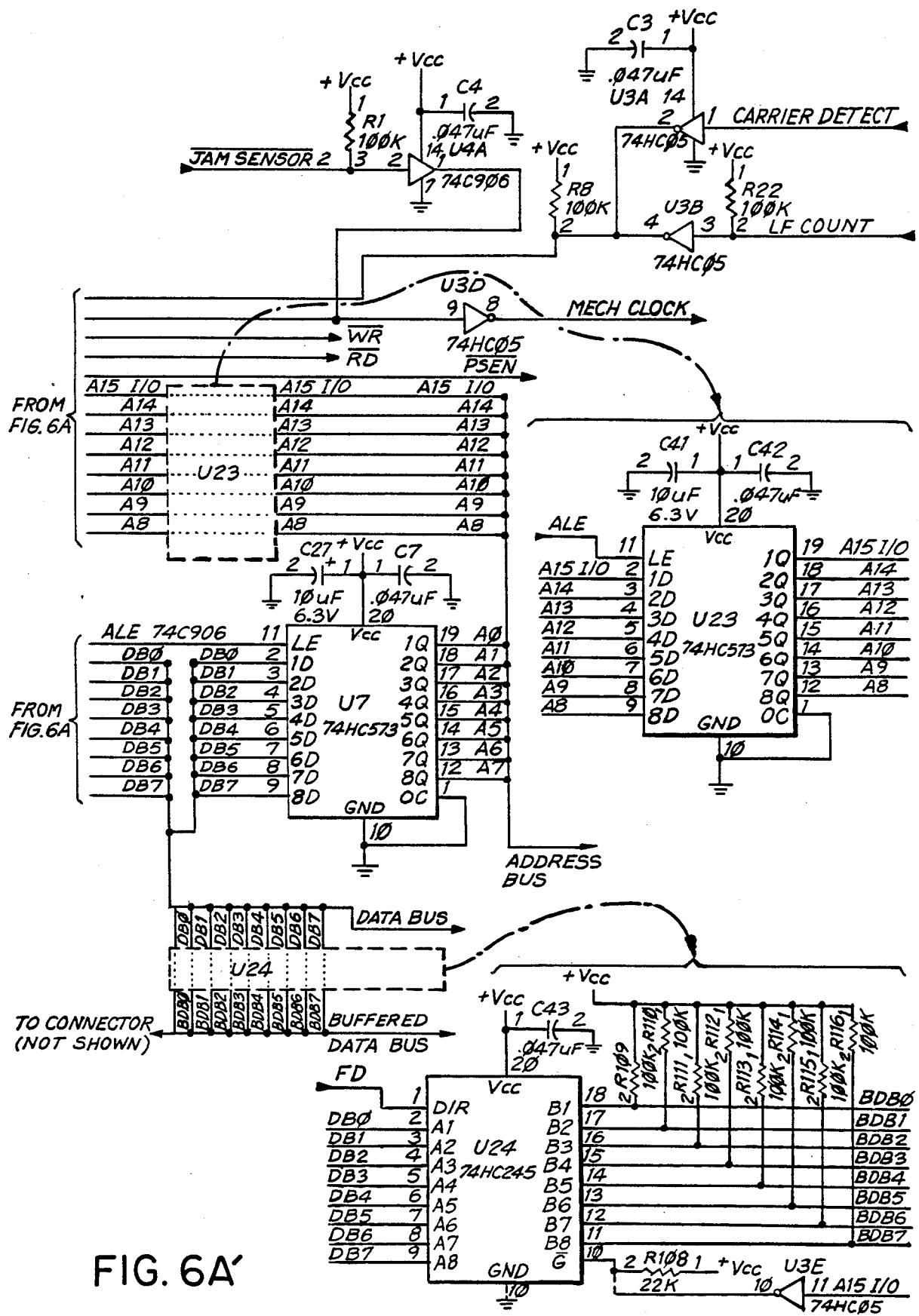

Circuits which implement the processing element 100 (FIG. 3) in accordance with a preferred embodiment of the invention are illustrated in FIGS. 6A through 13. Referring to FIGS. 6A', 6B and 7, the processing element 100 includes a single microcontroller 110, its associated memory 104A and 104B, a real time alarm 102, interface circuitry for the address and data buses as well as other interface circuitry. The microcontroller 110 selected is an 80C31, manufactured by Intel, although any of the available microcontrollers or microprocessors can be used. The 80C31 is a low power device, which performs the controller functions previously discussed. It is driven by a 3.6864 MHz crystal Y1 (FIG. 6A).

Figure 6B:
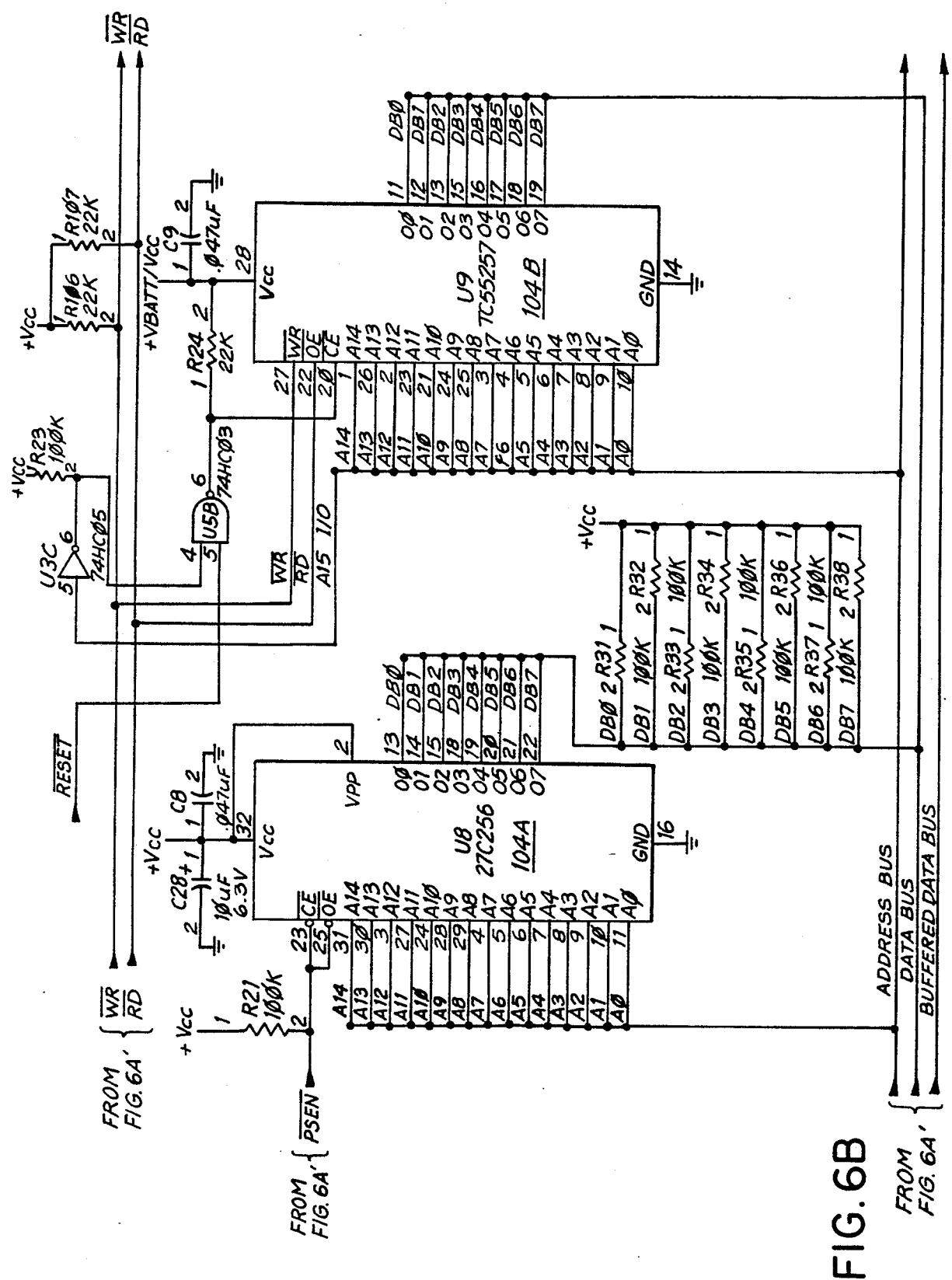

FIG. 6B shows 256k×8 programmable read only memory (PROM) 104A which stores the operational program for the controller of a coin operated phone as well as any constants needed. The PROM used is a 27C256, available from several manufacturers such as Intel. A 256k×8 random access memory (RAM) 104B is provided for storing results including the number of coins collected, the phone numbers dialed, etc. Like the other circuitry, it is powered from the phone line voltage on the tip and ring, however, battery voltage is also available at its power pin so that there is a backup voltage in case of a power failure during the phone call. The RAM used is a TC55257, manufactured by Toshiba.

The 80C31 microcontroller 110 has four I/O ports. Port 2 provides the high address bus, A8–A15. Port O provides a multiplexed data bus DB0–DB7 and a lower address bus A0–A7. Registers U23 and U7 of FIG. 6A' latch the high and low address buses, respectively, at the appropriate times. Transceiver U24 of FIG. 6A' provides a buffered data bus interface.

Ports 1 and 3 of the microcontroller 110 are utilized to provide an interface for other functions of the coin operated phone to the microcontroller 110. For example, the following lines transmit data to and from the coin acceptor 30 to the microcontroller 110: MECH CLOCK, MECH DATA, LF COUNT, JAM SENSOR 1-BAR, and JAM SENSOR 2-BAR. Other interface lines to the microcontroller 110 from the controller circuitry include the following signals SDA, SCL, RXD, TXD, RESET-BAR, INT0-BAR, RESET, +48VDCT/PADEN, E11/PAD/S, MODEM ENABLE, MUTE/KEY DEP, POWER DOWN, and CARRIER DETECT.

Figure 7:
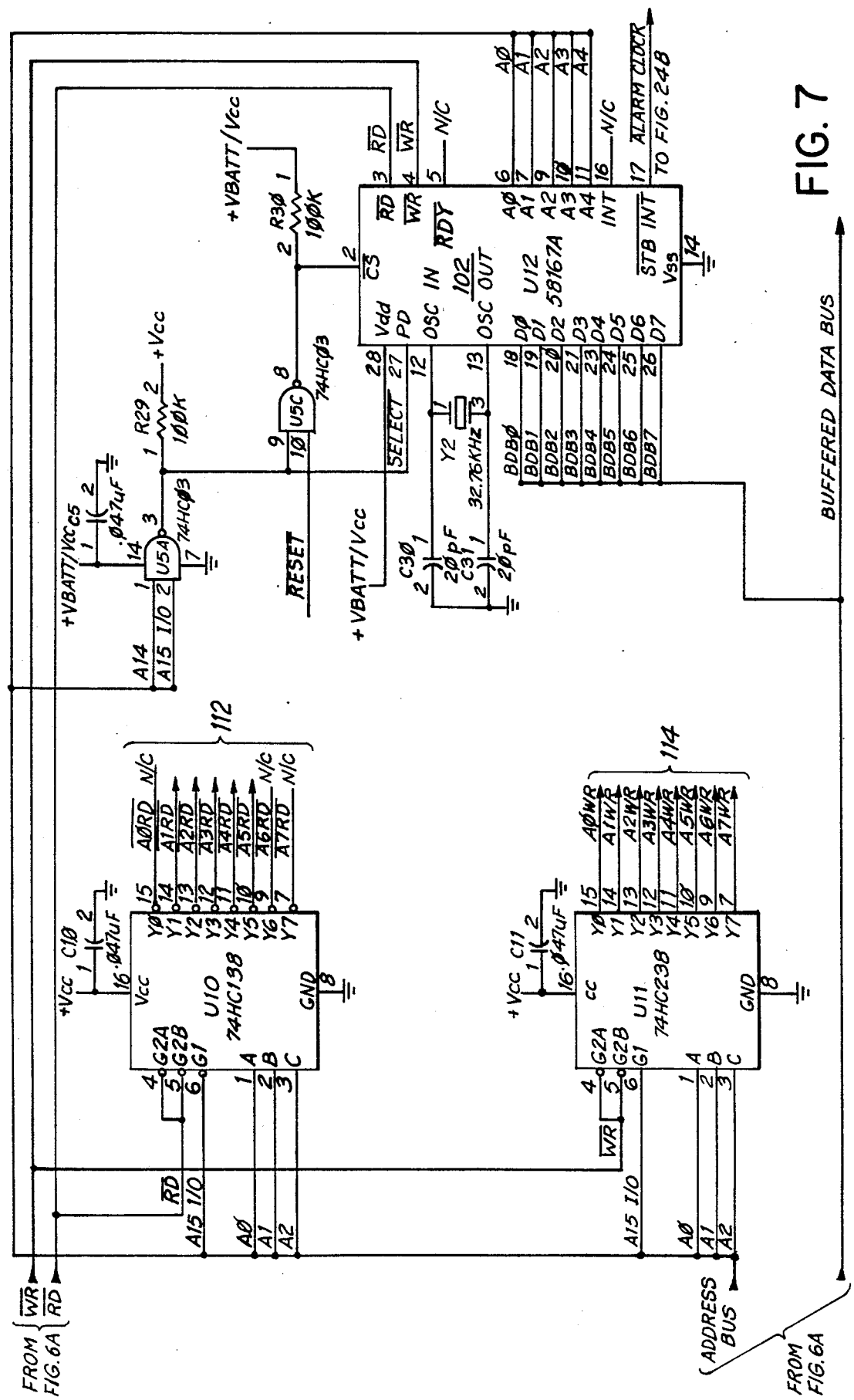

FIG. 7 shows more interface circuitry for the microcontroller 110. Decoders U10 and U11 decode several of the address bits from the microcontroller 110 address bus to provide read pulses (A0RD-BAR to A7RD-BAR) 112 and write pulses (A0WR to A7WR) 114 for the various circuits which interface with the microcontroller 110.

Figure 8:
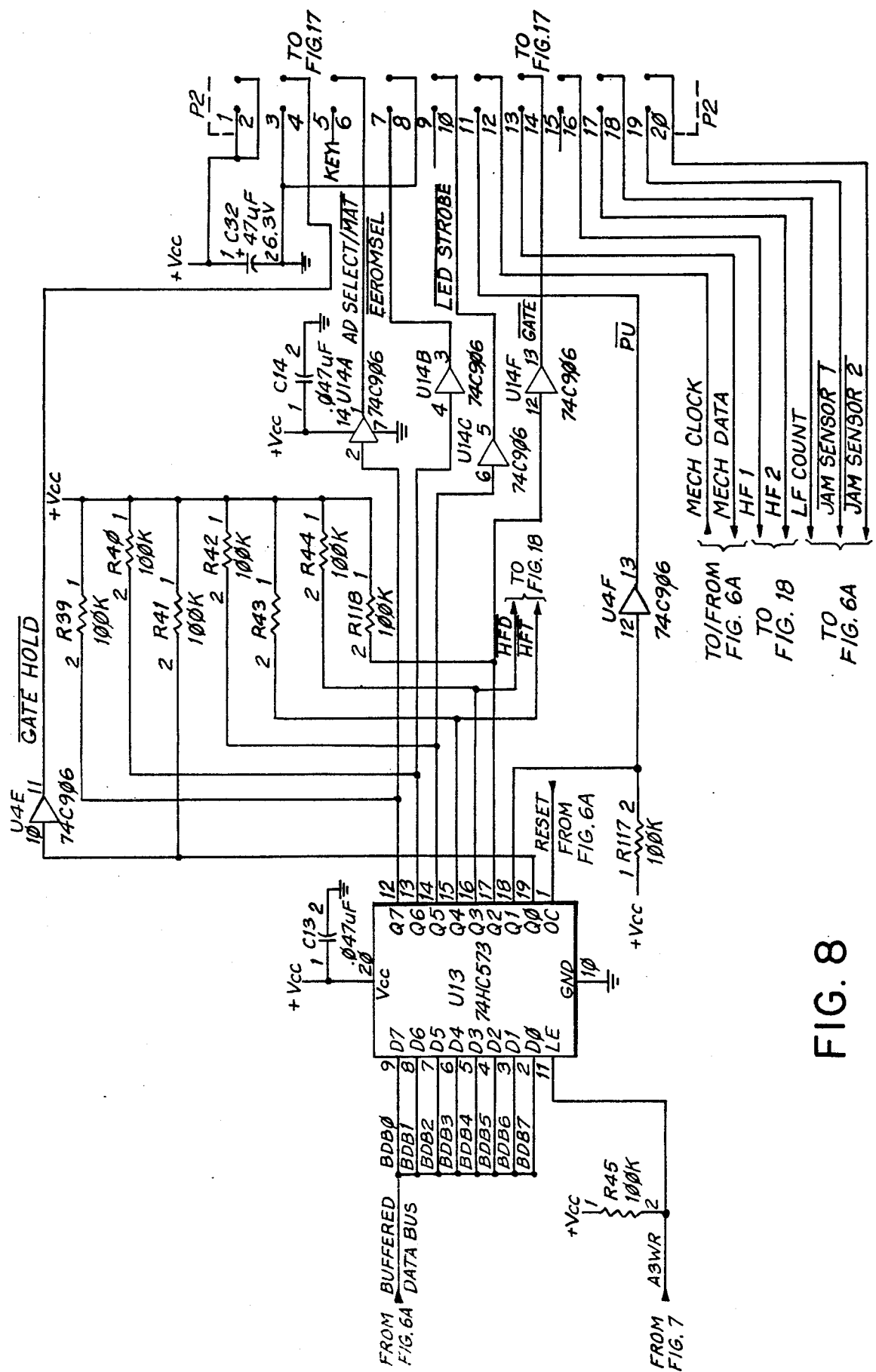

FIG. 8 shows another interface circuit for the microcontroller 110. Register U13 latches data from the buffered data bus under control of the write pulse, A3WR. The latched data is stored by the register U13, whose outputs remain high due to pull up resistors R39 to R44 and R118, until enabled by the line RESET from the microcontroller 110. Once enabled, the outputs of the register U13 are driven off the printed circuit board through the connector P2 to the coin acceptor 30.

Figure 9:
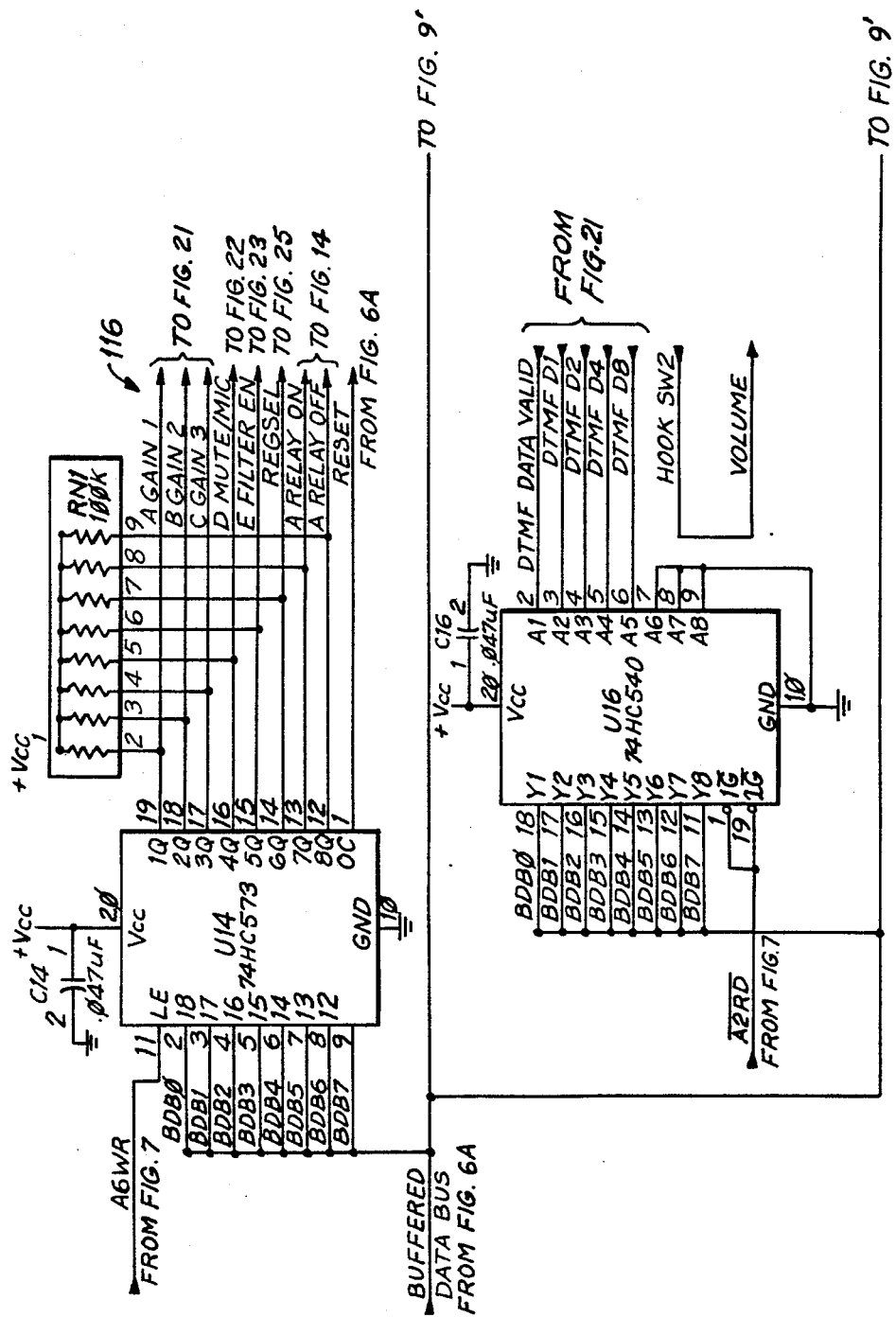
Figure 9:
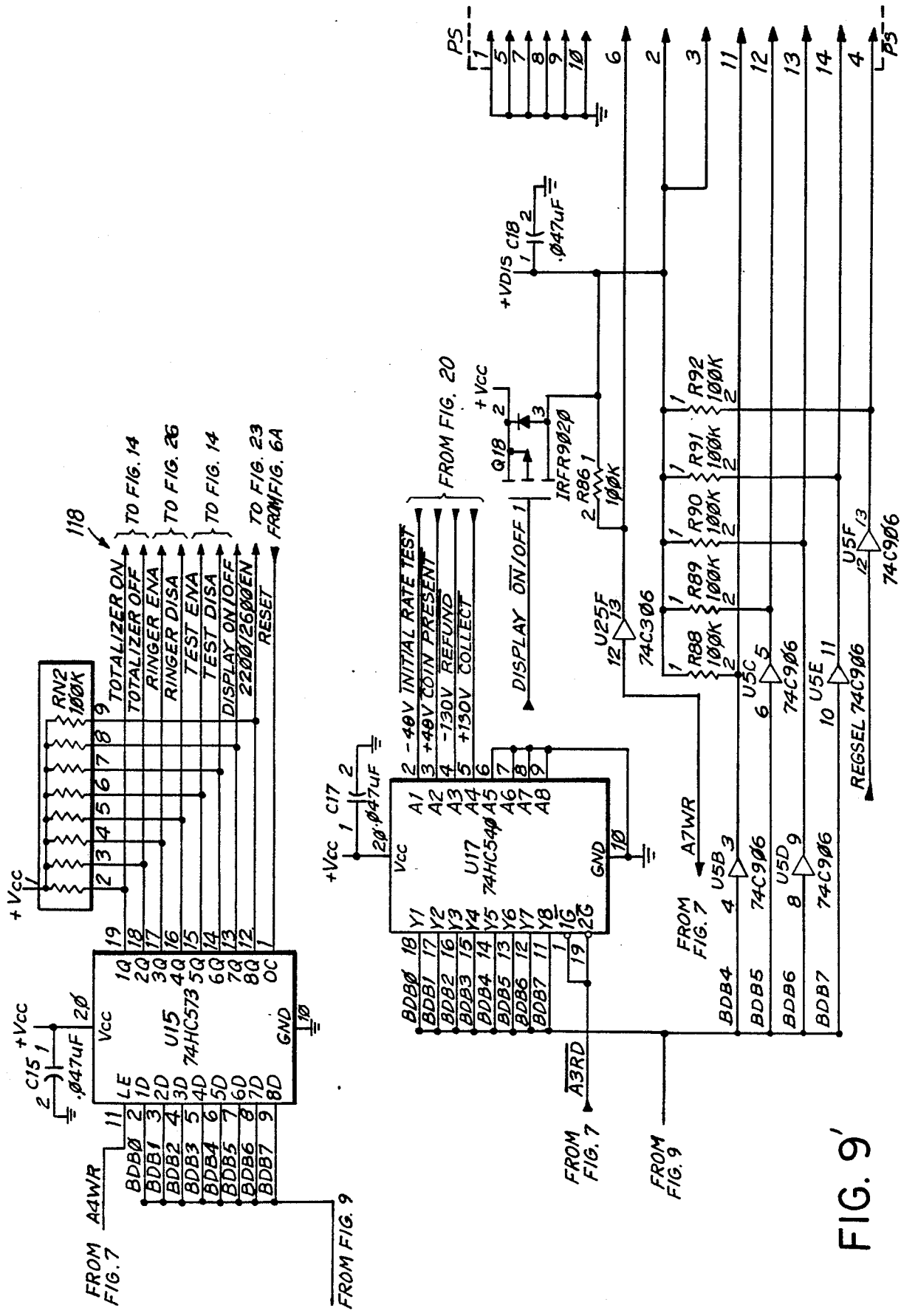

FIGS. 9 and 9' illustrates a circuit having status and control registers for the microcontroller 110. Registers U14 and U15 latch data from the buffered microcontroller data bus when write pulses A6WR and A4WR, respectively, are asserted. The outputs of registers U14 and U15 are groups of control signals 116 and 118, which are enabled by the signal RESET from the microcontroller 110. Buffers U16 and U17 provide status read registers for the microcontroller 110. Data from buffer U16 is enabled onto the data bus by a pulse on A2RD-BAR, allowing the microcontroller 110 to read DTMF signals, so that it can fulfill its call accounting functions. Data from buffer U17 is enabled on the data bus by a pulse on A3RD-BAR. The microcontroller 110 reads the state of the DC voltage on the tip 6 from this buffer so as to determine what function the central office 4 wants performed.

Figure 10:
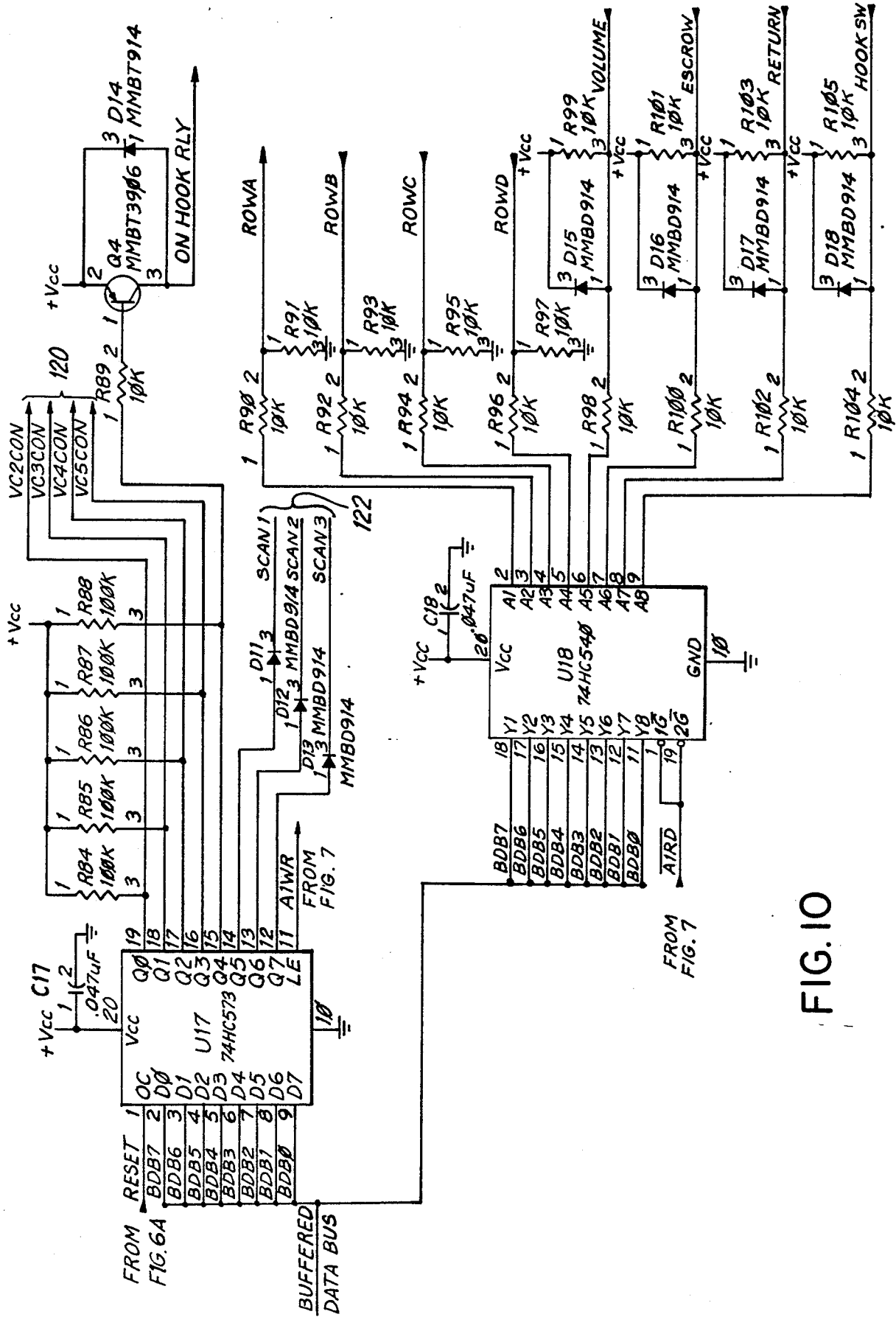

FIG. 10 shows more status and control registers. Register U17 latches data on the data bus when the write pulse AIWR is asserted and outputs the groups of control signals 120 and 122. Control signals 120 control the application of power to various components in the coin operated phone 2. Data from buffer U18 is enabled by AIRD-BAR when the microcontroller 110 wants to read the status lines illustrated.

Figure 11:
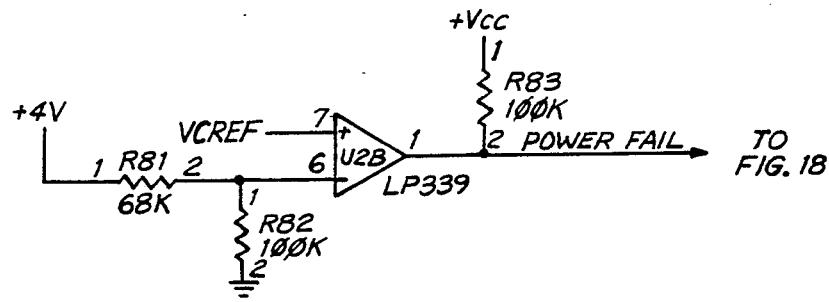

FIG. 11 illustrates a circuit that monitors the voltage. Comparator U2B has a reference voltage, VCREF, as one input and the 4 volt DC signal through a resistor network as the other input. When the resistance divided 4 volt signal falls below the threshold value VCREF, POWER FAIL is activated. This output is fed through a buffer to the microcontroller 110.

Figure 12:
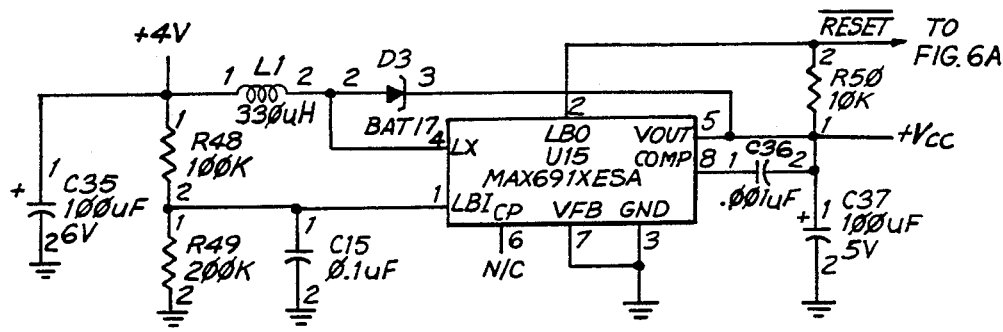

FIG. 12 shows a switching regulated power supply.

Figure 13:
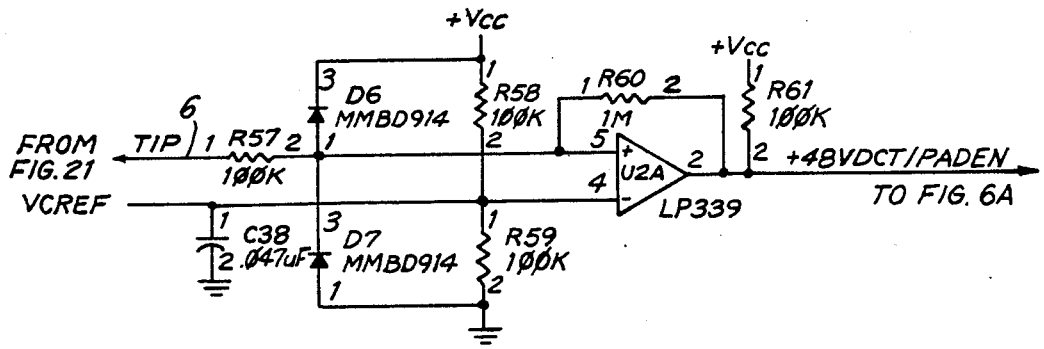

FIG. 13 illustrates a tip to ring polarity sensing circuit. Comparator U2A has the voltage on TIP 6 as one input and a reference voltage, VCREF, which is lower than the voltage on TIP 6, as its other input. When the voltage on TIP 6 falls below the reference voltage, which is always positive, it is necessarily negative. The output of the comparator, +48VDCT/PADEN, is activated and fed directly to a port of the microcontroller 110, so that the polarity of the voltage on the TIP 6 can be determined. The sensing of the polarity is done on the input side of the polarity guard, so that there are no voltage drops, thereby conserving energy.

The devices in FIGS. 6A through 13, which are used in the preferred embodiment to implement the processing element 100 (FIG. 3), are listed in Table 1 and are interconnected as illustrated in the drawings:

TABLE 1

DEVICES IN FIGS. 6A through 13

| Device | Product No. or Value | Drawing Reference |
|---|---|---|
| Microcontroller | 80C31 | 110 in FIG. 6A |
| Register | 74HC573 | U7, U23 in FIG. 6A; U13 in FIG. 8; U14-17 in FIG. 9, U17 in FIG. 10 |
| Transceiver | 74HC245 | U24 in FIG. 6A |
| Gate | 74HC05 | U3A, B, D, E in FIG. 6A; U3C in FIG. 6B |
| Gate | 74C906 | U4A-E in FIG. 6A; U14A-C, F, U4E,F in FIG. 8; U5B-F, U25F in FIG. 9; U2B in FIG. 11; U2A in FIG. 13 |
| Comparator | LP339 | U2C in FIG. 6A; |
| Crystal | 3.6864 MHz | Y1 in FIG. 6A |
|  | 32.76 kHz | Y2 in FIG. 7 |

TABLE 1-continued

DEVICES IN FIGS. 6A through 13

| Device | Product No. or Value | Drawing Reference |
|---|---|---|
| PROM | 27C256 | 104A in FIG. 6B |
| RAM | TC55257 | 104B in FIG. 6B |
| Gate | 74HC03 | U5B in FIG. 6B; U5A, C in FIG. 7 |
| Decoder | 74HC138 | U10 in FIG. 7 |
|  | 74HC238 | U11 in FIG. 7 |
| Clock | 58167A | U12 in FIG. 7 |
| Buffer | 74HC540 | U18 in FIG. 10 |
| Regulator | MAX 631XESA | U15 in FIG. 12 |
| Resistor Network | 100k | RN1, 2 in FIG. 9 |
| Resistor | 1 M | R13 in FIG. 6A; R60 in FIG. 13 |
|  | 200k | R4a in FIG. 6A |
|  | 68k | R11 in FIG. 6A; R81 in FIG. 11 |
|  | 22k | R18, 20, 108 in FIG. 6A; R24, FIG. 107 in FIG. 6B |
| Resistor | 100k | R1-5, 8, 10, 120, 14-17, 19, 22, 109-116 in FIG. 6A; R21, 23, 31-38 in FIG. 6B; R29-30 in FIG. 7; R39-47, 117-118 in FIG. 8; R86, 88-92 in FIG. 9; R84-88 in FIG. 10; R82-83 in FIG. 11; R48 in FIG. 12; R57-59, 61 in FIG. 13; R6-7 in FIG. 6A; R89-105 in FIG. 10; R50 in FIG. 12 |
|  | 100 | R9 in FIG. 6A |
| Capacitor | 100 uF | C35, 37 in FIG. 12 |
|  | 47 uF | C32 in FIG. 8 |
|  | 10 uF | C24, 27, 41 in FIG. 6A; C28 in FIG. 63 |
|  | 0.1 uF | C1-2 in FIG. 6A; C15 in FIG. 12 |
|  | 0.047 uF | C3, 4, 7, 23, 42, 43 in FIG. 6A; C8, 9 in FIG. 6B; C5, 10, 11 in FIG. 7; C13, 14 in FIG. 8; C14-18 in FIG. 9; C17-18 in FIG. 10; C38 in FIG. 13 |
|  | 0.001 uF | C36 in FIG. 12 |
|  | 30 pF | C25-26 in FIG. 6A |
|  | 20 pF | C30-31 in FIG. 7 |
| Inductor | 330 uH | L1 in FIG. 12 |
| Diode | MMDB914 | D11-15, 18 in FIG. 10; D6-7 in FIG. 13 |
|  | BAT17 | D3 in FIG. 12 |
| Transistor | IRFR9020 | Q18 in FIG. 9 |
|  | MMBT3906 | Q4 in FIG. 10 |

FIGS. 14 and 14' illustrate a circuit in accordance with a preferred embodiment of the invention that implements the ground lifting relay 160 (FIG. 3). The circuit includes the devices listed in Table 2 which are interconnected as illustrated.

TABLE 2

DEVICES IN FIGS. 14 and 14[1]

| Device | Product No. or Value | Drawing Reference |
|---|---|---|
| Relay | SPDT | K1, K2, K5 |
| Transistor | MMBT3906 | Q7-10, Q15-16 |
|  | MMBTA92 | Q5-6 |
| Diode | TMPD2836 | D23-24, D27-29 |
|  | 1N4004 | D13-14 |
|  | RD82P | D12 |
| Resistor | 10k | R73-74, R77-78, R83-84 |
|  | 3.3k | R76 |
|  | 510 | R72, 75 |

Figure 15:
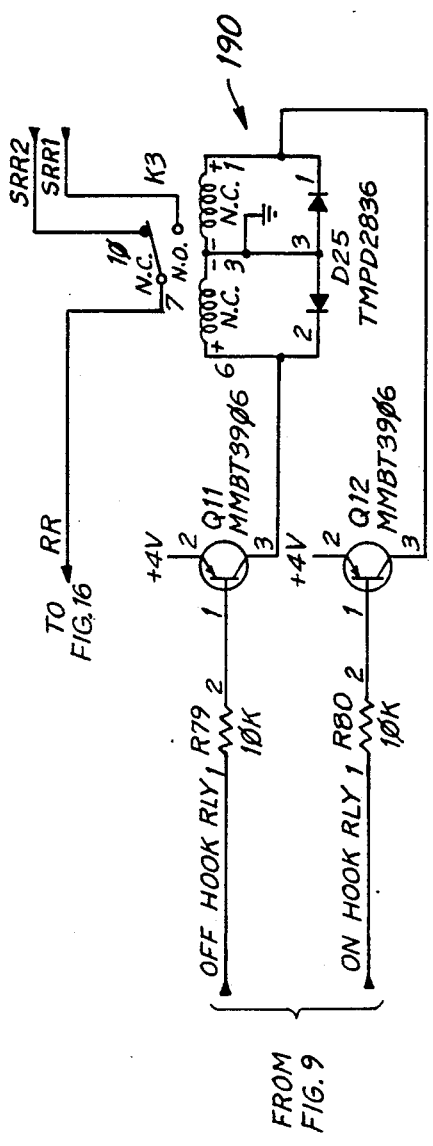
FIG. 15 is a schematic diagram of a preferred off hook detector circuit.
Figure 14:
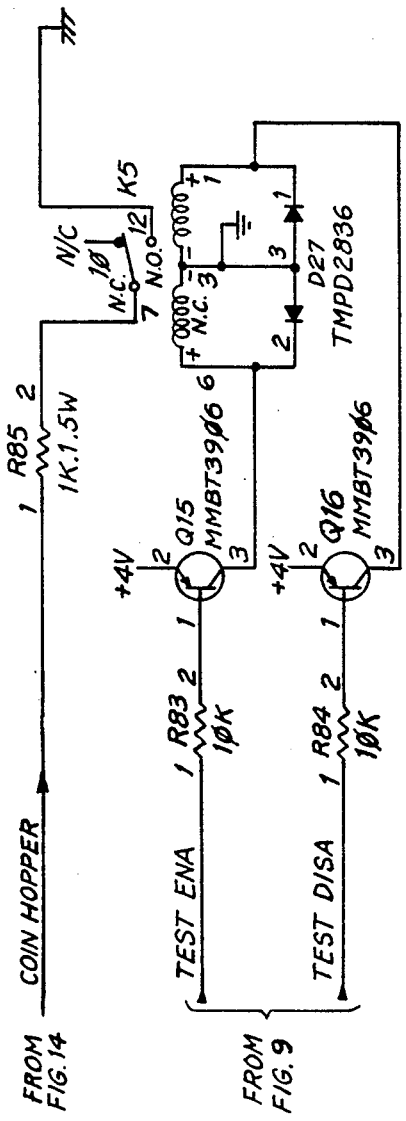

A circuit implementing the switch hook function detector circuit 190 of FIG. 3 is illustrated in FIG. 15. The circuit includes the devices listed in Table 3 which are interconnected as illustrated.

TABLE 3

DEVICES IN FIG. 15

| Device | Product No. or Value | Drawing Reference |
|---|---|---|
| Relay | SPDT | K3 |
| Transistor | MMBT3906 | Q11, 12 |
| Diode | TMPD2836 | D25, 30 |
| Resistor | 10k | R79-80 |

FIG. 16 illustrates a power supply circuit 230 that generates approximately 4 volts on its output 232 as a supply of voltage for the operational components of the coin operated phone. The circuit comprises the components listed in Table 4 which are interconnected as illustrated.

TABLE 4

DEVICES IN FIG. 16

| Device | Product No. or Value | Drawing Reference |
|---|---|---|
| MOV | | RV1 |
| GYRATOR | TEA1081 | U10 |
| DIODE | MMB2-5250B | D1, D2 |
| | 1N5818 | D3-6, 8 |
| RESISTOR | 13 | R29 |
| | 100k | R35-36 |
| | 620 | R37 |
| CAPACITOR | 27 pF | C29 |
| | 68 pF | C10 |
| | 4.7 uF, tantulum | C30 |

The power supply circuit 230 includes a polarity guard 234, which is constructed from four diodes D3-D6 that are arranged in a full bridge circuit. Schottky diodes, having a low forward voltage drop, are used to minimize the loss of voltage inherently associated with diodes, thereby, conserving power. These diodes, however, have a low reverse breakdown voltage, typically 20 volts maximum. The line voltage on the loop across the tip 6 and ring 8 is typically +/−48 volts. The coin operated phone pulls that voltage down to a range of 4 to 8 volts when in operation. There is, however, a short time after turn on when the diode bridge 234 is exposed to the full line voltage, thereby exposing the diodes D3-D6 to a voltage that exceeds their reverse breakdown rating. To overcome this problem, a pair of zener diodes D1 and D2 clamp the line voltage across TIP 6 and RR to +/−12 volts, thereby limiting the maximum voltage across the diodes D3-D6 in the polarity guard 234. The use of Schottky diodes in this circuit offers a significant power savings over the conventional method of using conventional diodes with a forward voltage drop which is three times higher but with a sufficient reverse voltage rating.

The output of the polarity guard 234 provides gyrator U10 with a positive signal, regardless of the polarity on the TIP 6, through series resistor R29. This signal has a DC component as well as an AC component consisting of speech and audio tones. The gyrator U10 removes the AC components and outputs approximately 4 volts DC which provides power to the components in the controller.

Figure 17:
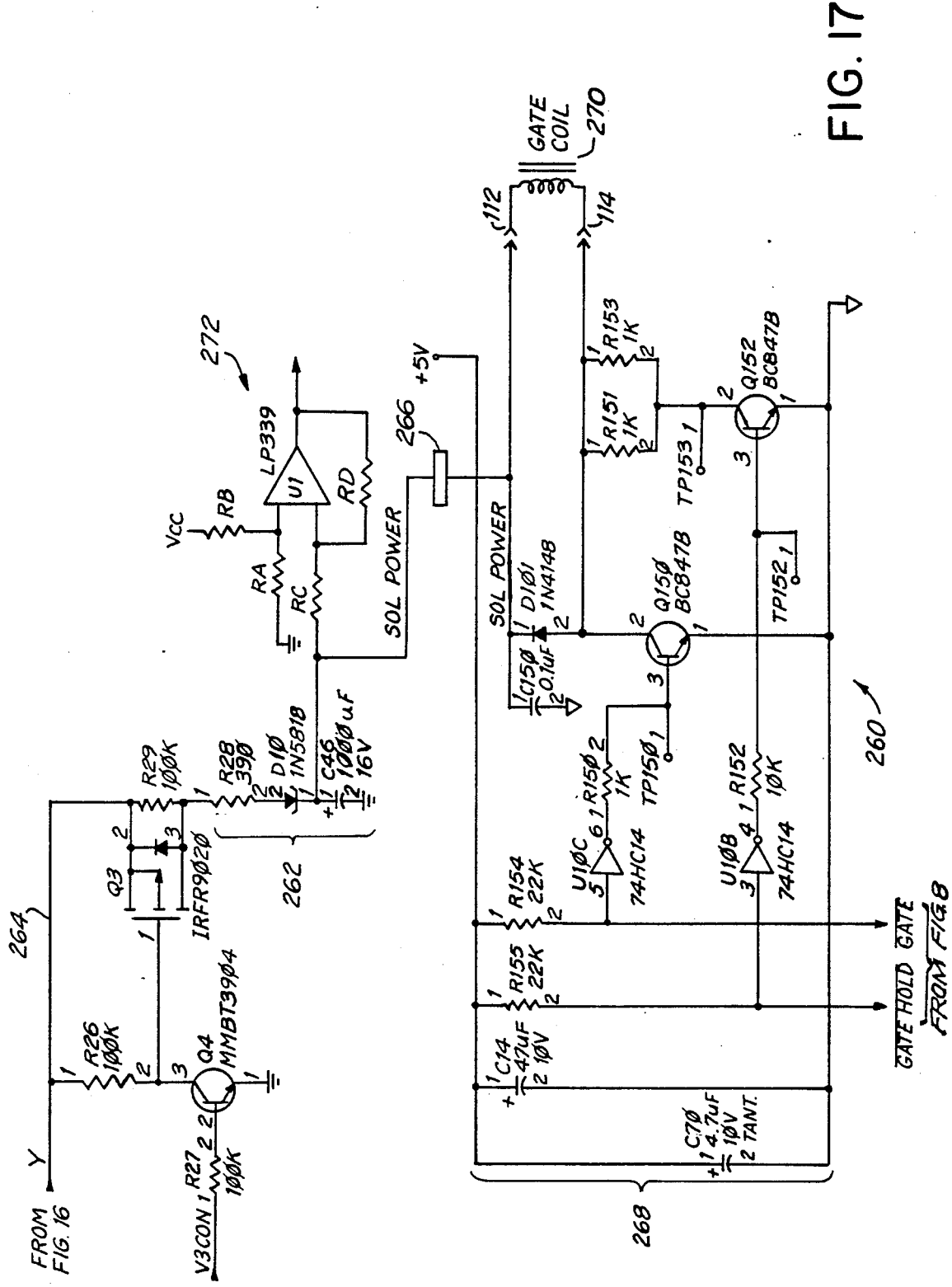
FIG. 17 is a schematic diagram of a preferred power supply and power control circuit for controlling the power supplied to the solenoid of a coin routing gate in the electronic coin acceptor of FIG. 2.

FIG. 17 shows a circuit 260 in accordance with a preferred embodiment of the invention that provides power to the gate solenoid under control of the microcontroller 110 so that the gate 38 in the coin acceptor 30 is operated to properly accept or reject the coins. This supply 260 comprises the components listed in Table 5 which are interconnected as illustrated.

TABLE 5

Devices in FIG. 17

| Device | Product No. or Value | Drawing Reference |
|---|---|---|
| Gate | 74HC14 | U10B-C |
| Comparator | LP339 | U1 |
| Transistor | IRFR9020 | Q3 |
| | MMBT3904 | Q4 |
| | BC847B | Q150,152 |
| Resistor | 100k | R26-29 |
| | 22k | R154-155 |
| | 10k | R152 |
| | 1k | R150-151, R153 |
| | 390 | R28 |
| | — | RA |
| | — | RB |
| | — | RC |
| | — | RD |
| Capacitor | 1000 uF | C46 |
| | 47 uF | C14 |
| | 4.7 uF | C70 |
| | 0.1 uF | C150 |
| Diode | 1N4148 | D101 |
| | 1N5818 | D10 |

The source of the power to the solenoid from the circuit 260 is a charge well 262. The charge well has an energy storage device, for example, a capacitor C46 that is charged when the phone 2 enters the off-hook state. The capacitor C46 stores the energy until it is needed to activate the solenoid. The initial charging of the capacitor C46, is done under control of the microcontroller 110. When the phone goes off-hook, control signal V3CON from the microcontroller 110 is inactive, so that transistor Q4 is turned off. The current on wire 264, which is the output of the polarity guard 234 of FIG. 16, flows through resistor R26 to the base of transistor Q3, turning it on. Current flows from the source to the drain of the transistor Q3, through resistor R28 and diode D10 to charge capacitor C46. While the capacitor C46 is being charged, all other components are powered down or disconnected from the power supply of FIG. 16 under control of the microcontroller 110, so that full power is delivered to the capacitor C46.

Once the capacitor C46 is fully charged, the microcontroller 110 asserts the control signal U3CON to turn on the transistor Q4. Current from the wire 264 now runs through the transistor Q4 so that transistor Q3 turns off. A large resistor R29 is provided so that a trickle current reaches the capacitor C46 to keep it fully charged. The high resistance of resistor R29 precludes the degradation of the quality of the audio signal on wire 483 when speech signals are present.

The charge well components, resistor R28 and capacitor C46, are selected to match their characteristics to the solenoid coil, thereby maximizing the energy transfer to the coil so as to save power. The values of these components are, therefore, dependent on the coil chosen for use in the solenoid.

The coil of the solenoid is connected to the capacitor C46 through the connector 266. A circuit 268 for energizing the coil 270 with energy from the capacitor C46 is illustrated. Normally, the microcontroller 110 holds the two control lines, GATE-BAR and GATE HOLD-BAR, inactive so that the inputs to inverters U10B and U10C are both high. The outputs of the inverters, therefore, drive the bases of the transistors Q152 and Q150 low so that they conduct no current. When the microcontroller 110 has determined that a coin should be accepted based on data from the coin acceptor, power is applied to the solenoid of the gate as follows. First the microcontroller 110 asserts a high energy pulse with a fast rise time and a duration of approximately 80 milliseconds to the control signal, GATE-BAR. Transistor Q150 is turned on and current flows from the capacitor C46 through the coil 270 and through the transistor Q150. Maximum power is applied to the gate coil 270 during this time. This initial pulse causes the field in the solenoid to rapidly build, thereby reducing activation time. In the second stage, the microcontroller 110 asserts GATE HOLD-BAR and turns off GATE-BAR. Transistor Q152 is turned on, so that current flows through the coil 270 and through resistor network R151 and R152 to transistor Q152, thereby limiting the current flow and saving power. This line is activated for a duration of approximately 140 milliseconds.

A circuit 272 that monitors the energy stored in capacitor C46 is provided. The output of the capacitor C46 is fed into a comparator U1. The other input to the comparator U1 is a voltage reference formed by a resistance network RA and RB. The output of the comparator U1 is fed to the microcontroller 110. Before the microcontroller 110 asserts the control line GATE-BAR, to begin coin acceptance, it checks the comparator U1 output to insure that there is sufficient charge on the capacitor C46 to actuate the coil arm, thereby preventing jamming.

Figure 18:
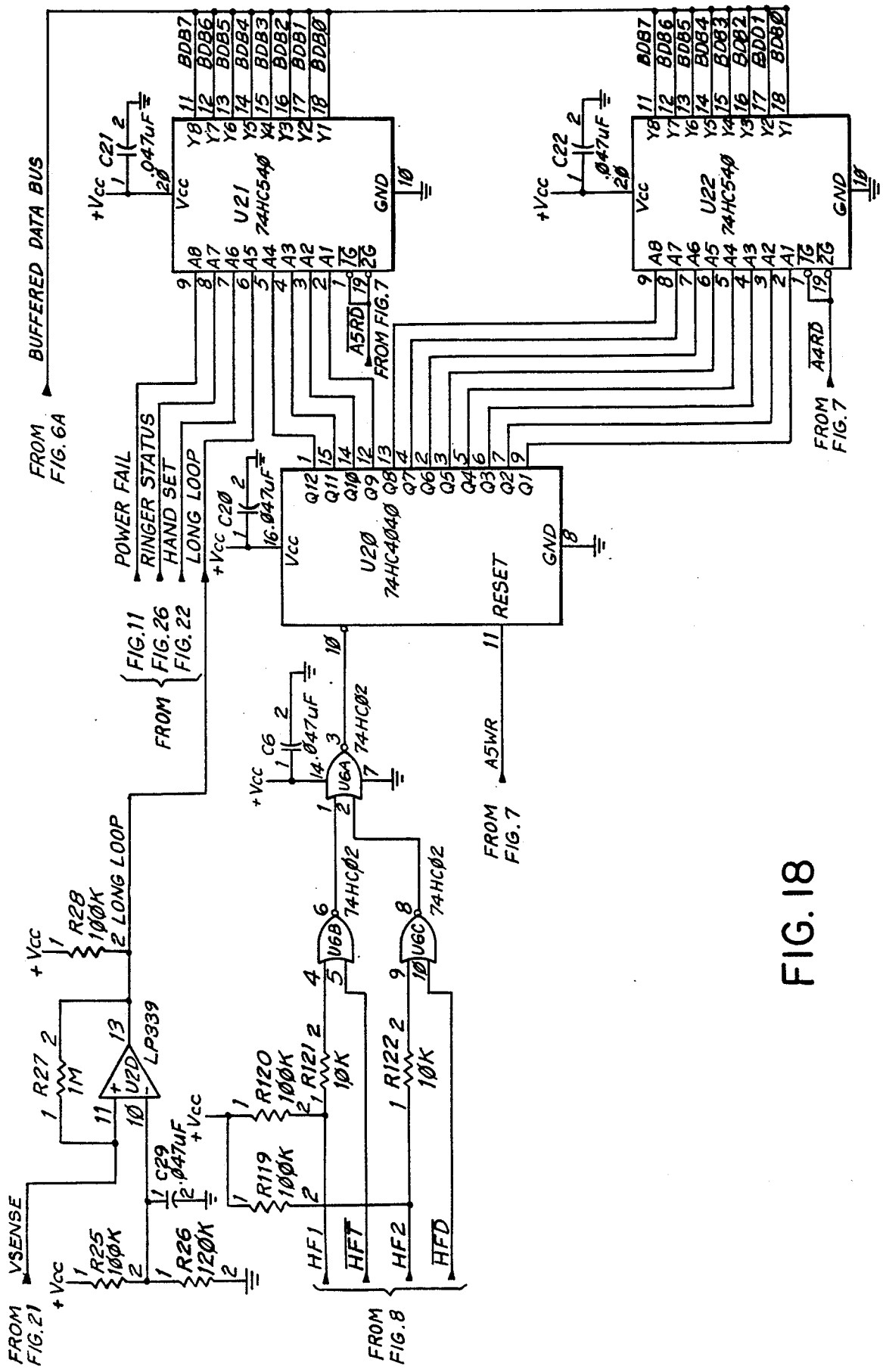
FIG. 18 is a schematic diagram of a preferred interface circuit for interfacing the microprocessor of FIG.

FIG. 18 illustrates a circuit which provides an interface for coin validation data generated by the coin acceptor 30 to the microcontroller 110. The circuit comprises the components in Table 6 which are interconnected as illustrated.

TABLE 6

| Device | Devices in FIG. 18 | |
|---|---|---|
| | Product No. or Value | Drawing Reference |
| Counter | 74HC4040 | U20 |
| Buffer | 74HC540 | U21, U22 |
| Gate | 74HC02 | U6A-C |
| Comparator | LP339 | U2D |
| Resistor | 100k | R119-120, R25-26, 28 |
| | 10k | R121-122 |
| | 1M | R27 |
| Capacitor | 0.047 uF | C6, C20-22, C29 |

Coin validation data lines HF1 and HF2 from the coin acceptor are received by the controller over a connector P2, as shown in FIG. 8. These signals are input to gates U6B and U6C, respectively. The data content of these signals is frequency based. When either HF1 and HF2 are enabled by microcontroller 110 control lines HFT-BAR and HFD-BAR, respectively, one of them appears at the clock input on pin 20 of the counter U20. This counter U20 counts the number of pulses on the enabled data line, outputting that number to buffers U21 and U22. The microcontroller 110 reads the contents of the buffers U21 and U2 by asserting the control lines A4RD-BAR and A5RD-BAR, respectively, and then processes the validation data to determine if the coin should be accepted. Buffer U21 also provides four other status lines; POWER FAIL, RINGER STATUS, HAND SET and LONG LOOP, which can be monitored by the microcontroller 110.

Referring to FIG. 19 of the drawings, a circuit 320 for generating tones with dual frequencies is illustrated. This circuit generates dual tone frequencies for a modem call as well as for coin validation during a toll call. The circuit comprises the components in Table 7 which are interconnected as illustrated in FIG. 19.

TABLE 7

| Device | Devices in FIG. 19 | |
|---|---|---|
| | Product No. or Value | Drawing Reference |
| Tone Generator | PCF3311TD | U6, U7 |
| Crystal | 3579645 MHz | Y2 |
| | 6.6 MHz | Y1 |
| Amplifier | LP224M | U1A |
| Resistor | 1M | R1-2 |
| | 100k | R8 |
| | 47k | R3-6 |
| Capacitor | 0.047 uF | C6-7 |

During a modem call from the phone 2 to the central office 4, the phone must generate dual tone frequency signals to transmit over the phone lines to indicate the number being called. The circuit 320 generates such a signal under control of the microcontroller 110, which sends data to tone generator U7 over the buffered data bus by asserting the control line A0WR. In the case of a modem call, tone generator U6 remains inactive. The dual tone signal from generator U7 is output through series resistor R5 to amplifier U1A and on to the speech network 390 of FIG. 21, which injects the signal onto the phone lines.

During a toll call, the phone 2, must generate a unique dual tone signal for each type of coin deposited and transmit this signal to the central office 4. In this case, both tone generators U6 and U7 are activated. They are however, programmed by the microcontroller 110 to generate a signal having only a single frequency. The single frequency output of each tone generator U6 and U7 is passed through series resistors R4 and R5, respectively. Amplifier UIA mixes the single tone signals, generating a dual tone frequency signal which is passed to the speech network 390 of FIG. 21, where it is inserted onto the phone lines for transmission to central office 4.

During the processing of a call, the central office 4 connected to the phone 2 controls the DC voltage and polarity on the phone lines. This voltage instructs the phone 2 as to its next step. FIG. 20 shows a circuit for sensing the amplitude and polarity of the DC voltage on the tip 6 as referenced to earth ground. The circuit comprises the components listed in Table 8 which are interconnected as illustrated in FIG. 20.

TABLE 8

| Device | Devices in FIG. 20 | |
|---|---|---|
| | Product No. or Value | Drawing Reference |
| Detector | IL223 | U20-23 |
| Resistor | 1 M | R62, 65, 68, 71 |
| | 470k | R61, 64, 67 70 |
| | 20k | R60, 63, 66, 69 |
| Diode | 1N4004 | D15, 17, 19, 21 |
| | RD62P | D16, 18 |
| | MMB2526B | D20, 22 |

When a current flows through the internal photodiodes in each of the detectors U20 to U23, the output of each detector (pin 6) is pulled low as the internal transistors conduct. The input current is controlled by the input circuits having components including zener diodes D16, D18, D20 and D22, respectively. Each detector U20-U23 and its associated input circuit is arranged to sense a different voltage on the tip 6. The output of each detector is fed to the microcontroller 110 through a status register, so that the microcontroller can appropriately control phone 2 operations according to central office command.

FIGS. 21 and 21' show a circuit that implements the speech and audio network 380. It comprises the components in Table 9 which are interconnected as illustrated.

TABLE 9
Devices in FIGS. 21 and 21[1]

| Device | Product No. or Value | Drawing Reference |
|---|---|---|
| Audio IC | 1067 | 390 |
| Switch | 74HC4053M | 405 |
| DTMF decoder | 204 | 395 |
| Crystal | 3.579545 MHz | Y4 |
| Transformer | | T1 |
| Transistor | IRFR9020 | Q2 |
| Resistor | 1M | R24 |
| | 200k | R47, 49 |
| | 130k | R30 |
| | 100k | R34, 39–40 |
| | 68k | R114 |
| | 47k | R46 |
| | 24.6k | R41 |
| | 22k | R48 |
| | 10k | R115 |
| | 3.9k | R32 |
| | 3.6k | R38 |
| | 2.4k | R25 |
| | 390 | R33 |
| | 130 | R111,112 |
| | 20 | R31 |
| Capacitor | .036 F | C34 |
| | 3300 uF | C33 |
| | 10 uF | C43 |
| | 4.7 uF | C40 |
| | 1 uF | C35 |
| | 0.22 uF | C51 |
| | 0.1 uF | C11, 41, 62 |
| | 0.0047 uF | C12, 19 |
| | 0.01 uF | C27–28, 31, 36, 44, 52 |
| | 0.0022 uF | C32, 38 |
| | 0.001 uF | C65 |
| | 100 pF | C37 |
| Diode | SM4T-24ARM | D1 |
| | IMPD 2836 | D9 |

The audio device 390 performs several functions, including: receiving audio data from either the modem 400 or the microphone 11 on the MIC+ input (pin 9) and inserting an AC signal representative of the audio signal onto the phone lines. It also receives a signal from the phone line having DC and AC components. It separates these components and outputs the resulting audio signals on QR+ and QR− to either the earpiece 12 or the modem 400 (FIG. 25) through switch 405. It also receives DTMF signals from the circuit of FIG. 19 which are inserted onto the phone line for transmission to the central office 4. Capacitor C11 is provided to detect the DTMF signals from the keypad 14.

The audio device 390 can also be powered down when not needed under control of the microcontroller 110. This is done by the assertions of the POWER DOwN signal and it results in a significant power savings, as this device 390 tends to draw significant power when in operation.

A long loop detect circuit 391 provides the capability to monitor the following: (1) the quality of the line in use (2) the approximate distance of the phone lines, (3) any degradations in the line itself, (4) the apparent audio quality of the line and, (5) if the circuit is pulling too much power off the line, in which case the rate of coin acceptance can be reduced.

FIG. 22 shows a circuit that processes the audio signal from either the microphone 11 or the modem 400 to the audio device 390. The circuit includes switch 420 and the preamplifier and low pass filter circuit 415. The circuit comprises the components in Table 10 which are interconnected as illustrated in FIG. 22.

TABLE 10
Devices in FIG. 22

| Device | Product No. or Value | Drawing Reference |
|---|---|---|
| Switch | 74HC4053M | U13A |
| Amplifier | LP224M | U1C |
| Gate | 74HCT05 | U2F |
| Resistor | 681k | R51 |
| | 100k | R50, 55, 57 |
| | 68.1k | R53 |
| | 47.5k | R52 |
| | 30.1k | R54 |
| | 10k | R56 |
| Capacitor | 0.1 uF | C47–48 |
| | 0.01 uF | C50 |
| | 0.047 uF | C13, 49 |
| | 220 pF | C53 |
| Diode | MMBD914 | D11 |

The input to switch 420 is either MIC IN, from the microphone 11, or AUX AUDIO IN 2, from the modem 400. The switch 420 selects one of them to process based on the control line D MUTE/MIC, which is controlled by the microcontroller 110. The selected signal is then amplified and filtered by the circuit 415, whose output is passed to the notch filter circuit 470 of FIG. 23.

FIG. 22 also illustrates a circuit 430 for detecting the removal of the handset 10. The circuit 430 receives its input from the microphone 11 and provides output signals to the microcontroller 110. It detects the microphone 11 impedance and, therefore, the presence or absence of the microphone 11, without requiring extra lines and using a very small DC current so as to minimize power usage. If the microphone 11 is present, a small current flows, so that the input to gate U2F is low and its output is high. If the microphone 11 is removed, resistor R55 pulls the input to gate U2F high, so that the signal to the microcontroller 110 goes low, thereby signaling a problem.

This circuit 430, therefore, solves a problem with conventional phones, wherein the removal or destruction of the handset 10 causes the phone to remain inactive until the destroyed handset is discovered by a serviceman. The controller of the present invention solves this problem with circuit 430 and its remote diagnostics. If a problem is discovered the controller can initiate a service call to a central office 4 so that the phone can receive immediate service.

The handset detect circuit 430 also provides means for volume control in the earpiece 12. A pushbutton 23 in the handset 10 is in series with the microphone 11. When a caller depresses the pushbutton, the circuit to gate U2F is opened, so that the input to gate U2F is pulled high and its output is low. The microcontroller 110 senses the low voltage and controls a resistance network to control volume in the earpiece 12. The circuit 430 also functions with conventional handset 10 which does not include a pushbutton, thereby offering flexible implementation.

FIGS. 23 and 23' shows, a circuit that implements the notch filter 470. The circuit is comprised of the components listed in Table 11 which are interconnected as illustrated.

TABLE 11

Devices in FIGS. 23 and 23¹

| Device | Product No. or Value | Drawing Reference |
|---|---|---|
| Filter | LTC1060 | U19 |
| Gate | 4001UB | U4A-D |
| Gate | 74C906 | U5A |
| Amplifier | LP224 | U1B, U1D |
| Crystal | 520 kHz | Y5 |
|  | 440 kHz | Y6 |
| Transistor | IRFR9020 | Q17 |
| Switch | 74HC4053M | U13B,C |
| Resistor | 1M | R94,95 |
|  | 499k | R108 |
|  | 453k | R106 |
|  | 100k | R42,109 |
|  | 68.1k | R43 |
|  | 60.4k | R98,107 |
|  | 54.9k | R100 |
|  | 47k | R96,97 |
|  | 30.1k | R44 |
|  | 28.7k | R101 |
|  | 19.1k | R102 |
|  | 10k | R45 |
|  | 4.99k | R99,103-104 |
|  | 1.58k | R105 |
| Capacitor | 10 uF | C4 |
|  | 0.1 uF | C22-23, 42,45 |
|  | 0.047 uF | C4-5, 19 |
|  | 0.001 uF | C54 |
|  | 20 pF | C20, 21 |

The notch filter circuit 470 implements red box and blue box fraud prevention by using a single switch capacitor filter device U19 to implement fourth order elliptic filters with center frequencies at either 2200 Hz or 2600 Hz, depending on whether oscillator 471 or 472 is enabled by the microcontroller 110. The use of a single switched capacitor filter device U19 to implement two filters offers a savings in power consumption. Furthermore, although two oscillators 471 and 472 are present, only one is enabled at a given time by the microcontroller 110, offering further power savings. The oscillator circuits 471 and 472 are selected by a single control line, 2200/2600 EN, from the microcontroller 110. This saves control lines from the processor and simplifies software.

The filter device U19 requires an analog ground connection with a voltage at 0.5 Vcc where the device receives power from a single ended supply. Conventional circuits have used a resistor divider to implement this connection. To maintain accuracy with this conventional arrangement, a large percentage of the supply current must flow through the divider network. The present invention utilizes an operational amplifier U1D to implement this connection. The amplifier U1D has a high input impedance to minimize current flow and a low output impedance that provides accuracy for the analog ground pin. This analog ground circuit further conserves power.

A switching arrangement with switches U13B and U13C is provided so that the filter can be turned off and the audio from the microphone 12 bypassed to the speech and audio network 390. The switching is controlled by the microcontroller 110 over the control line E FILTER EN.

FIGS. 24 and 24' illustrates, a circuit that implements the monitor system 510. This circuit is comprised of the components in Table 12 which are interconnected as illustrated.

TABLE 12

Devices in FIGS. 24 and 24¹

| Device | Product No. or Value | Drawing Reference |
|---|---|---|
| I/O Expander | PCF8574 | 520 |
| Voltage Detector | TCL7665 | U16 |
| Transistor | MMBT 3904 | Q1 |
|  | MMBT 3906 | Q2-3 |
| Diode | MMBD914 | D4-5, 9-10 |
|  | MMB25245 | D8, 19 |
| Resistor | 1M | R53, 62 |
|  | 680k | R55 |
|  | 100k | R54, 64-67, 73-80 |
|  | 47k | R63 |
|  | 10k | R52-56, 68-72 |
|  | 4.7k | R51 |
| Capacitor | 100 uF | C39, 44 |
|  | 1 uF | C40 |
|  | 0.047 uF | C16, 19 |

This circuit monitors various inputs. I/O Expander 520 receives power from the internal battery 511 when the phone 2 is on hook. When one of the inputs is activated, the I/O Expander 520 outputs a high on INT.

This output has two functions. The first is to drive the low power relay driver 513 which initiates an "internal off-hook" condition, wherein the phone 3 initiates a phone call without the removal of the handset 10. The capacitors C39 and C44 are charged by the internal battery 511. Normally, transistors Q2 and Q3 are turned off. When one of the inputs to the I/O Expander 520 is activated, INT is asserted by I/O Expander 520, turning on transistors Q2 and Q3. This allows the charge on capacitors C39 and C44 to be output to a relay which connects the phone lines to the phone 2.

This circuit overcomes two fundamental problems. The first, is that impulse energy is derived from the capacitors and not the battery which is incapable of providing such impulse currents. Second, this circuit provides an extremely low power drain on the battery, thereby increasing battery life and allowing a smaller, more inexpensive battery to be used.

A low power state machine 514 is provided to sense whether the phone coin box was removed, even if the phone 2 is not powered. A voltage monitor U16, which is powered by the internal battery 511, monitors the coin box switch and outputs a signal to the expander 520 when the coin box is opened.

FIGS. 25 and 25' shows a circuit that implements the modem 400. This circuit comprises the components listed in Table 13 which are interconnected as illustrated.

TABLE 13

Devices in FIGS 25 and 25¹

| Device | Product No. or Value | Drawing Reference |
|---|---|---|
| Modem | SSJ73K212L-251M | 400 |
| Gate | 74C906 | U25A-E |
|  | 74HCT05 | U2A-E |
| Transistor | MMBT3904 | Q24-26 |
|  | IRFR9020 | Q1 |
| Crystal | 11.059 MHz | Y3 |
| Resistor | 2.2M | R9 |
|  | 100k | R7, 10-13, 14, 16, 22 |
|  | 47k | R113 |
|  | 10k | R15, 17-19, 21 |
|  | 1k | R20 |
| Capacitor | 22 uF | C59 |
|  | 1 uF | C60 |

TABLE 13-continued

Devices in FIGS 25 and 25[1]

| Device | Product No. or Value | Drawing Reference |
|---|---|---|
| | 0.1 uF | C55, 58, 61 |
| | 0.047 | C63 |
| | 27 pF | C56-57 |

The modem 400 transmits data from the microcontroller 110 to the central office 4. It operates on a BELL 212A standard and can transmit up to 1200 characters per second.

FIG. 26 shows a ring detector circuit. This circuit comprises the components listed in Table 14, which are interconnected as illustrated.

TABLE 14

Devices in FIG. 26

| Device | Product No. or Value | Drawing Reference |
|---|---|---|
| Voltage detector | IL223 | U24 |
| Gate | 74HC03 | U5D |
| IC | LB1006AB | U18 |
| Relay | SPDT | K4 |
| Transistors | MMBT3906 | Q13-14 |
| Diodes | TMPD2836 | D26 |
| | BAT17 | D1 |
| | MMB25245 | D2 |
| | 1N4006 | D33-36 |
| Resistor | 10M | R46 |
| | 1M | R110 |
| | 10k | R81-82 |
| | 8.2k | R87 |
| Capacitor | 10 uF | C12, 25-34 |
| | 0.1 uF | C33 |
| | 0.47 uF | C24 |

The circuit detects when the handset 10 is taken off hook when the telephone was ringing. A capacitor C12 is charged by the internal battery voltage. When the detector U24, senses the ringing voltage which is present on the tip 6 and ring 8, the voltage across the capacitor C12 is instantaneously discharged through the detector U24. The capacitor C12 then takes several seconds to recharge so that the input to gate U5D remains low and the output is high. The microcontroller 110 checks the status line, RINGER STATUS, which is the output from gate U5D. If it is high the microcontroller knows there is an incoming call. The microcontroller 110 then checks to see if an incoming call is permitted. If it is, the microphone 11 and earpiece 12 are enabled, otherwise the audio is inhibited.

We claim:

1. A low power, coin operated telephone controller for controlling a coin operated telephone which has an on-hook state and an off-hook state, said controller being energized with power from tip and ring lines of a loop circuit from a central office during said telephone's off-hook state, said controller having:
   a standby mode during said telephone's on-hook state in which substantially no power is drawn by said controller from the tip and ring lines of the loop circuit;
   an audio network;
   a totalizer control means for signalling of accepted coin value to the central office;
   an electric coin mechanism for electronically testing coins and for generating coin data in the form of electrical signals for each coin deposited into said telephone;
   a power supply circuit having a plurality of outputs and which is energized with power from said tip and ring lines of the loop circuit for energizing said telephone controller during said telephone's off-hook state;
   interface circuitry for set up of status indicators and for monitoring telephone conditions during periods when no current is available between the tip and ring lines; and
   a single processing element comprising timing means for establishing times or durations of events or calls, and nonvolatile digital memory for storing a plurality of bits of data during both the off-hook state and on-hook state of the coin operated telephone, for processing said coin data and controlling the electronic coin mechanism, and for controlling operation of said audio network, said interface circuitry and said power supply circuit.

2. A low power, coin operated telephone controller as in claim 1, wherein said audio network further comprises a modem.

3. A low power, coin operated telephone controller as in claim 2, further comprising a circuit for initiating a call from said telephone to a phone number other than that of said telephone, said processing element controlling said modem so as to transmit and receive data.

4. A low power, coin operated telephone station as in claim 3, wherein said modem can transmit at least 1200 baud.

5. A low power, coin operated telephone controller as in claim 1, wherein said telephone controller further comprises a monitor circuit for performing event monitoring at said telephone when there is no current available from said loop circuit.

6. A low power, coin operated telephone controller as in claim 5, wherein said monitor circuit includes a battery to power said monitor circuit when there is no current available from said loop circuit.

7. A low power, coin operated telephone controller for controlling a coin operated telephone which has an on-hook state and an off-hook state, said controller being energized with power from tip and ring lines of a loop circuit from a central office during said telephone's off-hook state, said controller having:
   a standby mode during said telephone's on-hook state in which substantially no power is drawn by said controller from the tip and ring lines of the loop circuit;
   an audio network;
   a totalizer control means for signalling accepted coin value to the central office;
   an electric coin mechanism which generates coin data in the form of electrical signals for each coin deposited into said telephone;
   a power supply circuit having a plurality of outputs and which is energized with power from said tip and ring lines of the loop circuit for energizing said telephone controller during said telephone's off-hook state;
   interface circuitry for set up of status indicators and for monitoring telephone conditions during periods when no current is available between the tip and ring lines; and
   a single processing element comprising timing means for establishing times or durations of events or calls, and nonvolatile memory for storing data during off-hook and on-hook, for processing said coin data and controlling the electronic coin mechanism, and for controlling operation of said audio network, said interface circuitry and said power supply, said processing element controlling power distribution to each of said controller's components, enabling each of said components only as their function is needed.

8. A low power, coin operated telephone controller as in claim 3, wherein said phone number is programmably stored.

9. A low power, coin operated telephone controller as in claim 3, wherein said phone number network further comprises a speech circuit.

10. A low power, coin operated telephone controller as in claim 9, wherein the speech circuit may be selectively switched in and out of the audio network under control of the processing element.

11. A low power, coin operated telephone controller as in claim 1 or 9, wherein the audio network further comprises a DTMF decode circuit.

12. A low power, coin operated telephone controller as in claim 1 or 9, wherein the audio network further comprises a DTMF keypad.

13. A low power, coin operated telephone controller as in claim 1 or 9, wherein the audio network further comprises a coin tone generator.

14. A low power, coin operated telephone controller as in claim 1, wherein the audio network further comprises a DTMF generator.

15. A low power, coin operated telephone controller as in claim 1, wherein the audio network further comprises a fraud prevention means for selectively switching a plurality of filters into the audio network.

16. A low power, coin operated telephone controller as in claim 15, wherein at least one of the plurality of filters is automatically switched into and out of the audio network under the control of the processing element, based on the polarity of the tip and ring lines.

17. A low power, coin operated telephone controller as in claim 1, 15 or 16, wherein the audio network further comprises a means for feeding an unfiltered audio input signal to said telephone's receiver.

18. A low power, coin operated telephone controller as in claim 1 or 14, further comprising means for disabling a DTMF generator after a predetermined time of uninterrupted activation.

19. A low power, coin operated telephone controller as in claim 1, wherein the audio network further comprises a DTMF decode circuit to monitor DTMF signals generated by the DTMF keypad.

20. A low power, coin operated telephone controller as in claim 1, wherein said telephone includes a handset with a transmitter and said controller further comprises means for monitoring the impedance of the transmitter.

21. A low power, coin operated telephone controller as in claim 1, wherein said telephone includes a handset with a transmitter and said controller further comprises means for adjusting audio levels from the handset by operating a switch which causes the transmitter to be momentarily disconnected from the audio network.

22. A low power, coin operated telephone controller as in claim 1, wherein said telephone includes a handset with a transmitter and said controller further comprises means for detecting that said transmitter is disconnected for more than a predetermined length of time.

23. A low power, coin operated telephone controller as in claim 1, wherein the totalizer control means comprises a totalizer control circuit.

24. A low power, coin operated telephone controller as in claim 23, wherein the totalizer control circuit comprises a totalizer relay circuit.

25. A low power, coin operated telephone controller as in claim 23 or 24, wherein the totalizer control circuit comprises a coin bypass relay circuit.

26. A low power, coin operated telephone controller as in claim 25, wherein the coin relay bypass circuit is selectively controlled by the processing element to allow said controller to cause said telephone to originate calls without the deposit of money.

27. A low power, coin operated telephone controller as in claim 1, wherein the electronic coin mechanism comprises a coin detector sensor for detecting coin presence and blockage of a coin entryway.

28. A low power, coin operated telephone controller as in claim 1, wherein the electronic coin mechanism comprises at least one coin test sensor for generating data for coins inserted into said telephone.

29. A low power, coin operated telephone controller as in claim 1, wherein the electronic coin mechanism comprises a coin routing gate for directing coins to either an accept path or a reject path.

30. A low power, coin operated telephone controller as in claim 1, wherein one of said plurality of outputs of the power supply circuit is a gate solenoid output connected to a gate solenoid power circuit.

31. A low power, coin operated telephone controller as in claim 1 or 30, wherein one of said plurality of outputs of the power supply circuit is a +5 V power supply output connected to a +5 V power supply circuit, said +5 V power supply circuit being connected to a plurality of circuits requiring a source of +5 V.

32. A low power, coin operated telephone controller as in claim 1 or 30, wherein one of said plurality of outputs of the power supply circuit is an audio network voltage supply output connected to one or more components of the audio network.

33. A low power, coin operated telephone controller as in claim 1, wherein one of said plurality of outputs of the power supply circuit is a monitor circuit output connected to a monitor circuit.

34. A low power, coin operated telephone controller as in claim 1, 30 or 33, wherein said processing element controls the delivery of power to circuits and components of said controller so that power is selectively directed to one or more of the plurality of circuits requiring a source of +5 V, or one or more of components of the audio network, or the monitor circuit.

35. A low power, coin operated telephone controller as in claim 30, wherein power for a coin routing gate in the electronic coin mechanism is provided by the gate solenoid power circuit.

36. A low power, coin operated telephone controller as in claim 30, wherein the processing element selectively directs substantially all of the power available to said controller to the gate solenoid power circuit until the gate solenoid circuit is detected as storing a predetermined amount of power.

37. A low power, coin operated telephone controller as in claim 1, wherein the interface circuitry further comprises a ground lifting relay circuit.

38. A low power, coin operated telephone controller as in claim 1 or 37, wherein the interface circuitry further comprises an off-hook detector circuit.

39. A low power, coin operated telephone controller as in claim 38, wherein said processing element controls the off-hook detector circuit to selectively connect said loop circuit to the power supply circuit.

40. A low power, coin operated telephone controller as in claim 1, wherein the telephone stations draws less than 1 microampere (uA) of current from said loop circuit in the standby mode.

41. A low power, coin operated telephone controller as in claim 1, wherein the switch hook function circuit is connected to the processing element and provides an output signal indicative of switch hook position.

42. A low power, coin operated telephone controller as in claim 1, wherein after the power supply circuit has been connected to said loop circuit for a sufficient time, the power supply circuit provides power to the processing element which then leaves its standby state and performs a sequence of wakeup diagnostics.

43. A low power, coin operated telephone controller as in claim 42, wherein the sequence of wakeup diagnostics comprises interrogation of a handset detector.

44. A low power, coin operated telephone controller as in claim 42, wherein the sequence of wakeup diagnostics comprises determining if audio signals are being produced by a DTMF keypad.

45. A low power, coin operated telephone controller as in claim 42, wherein the sequence of wakeup diagnostics comprises strobing a coin detector of the electronic coin mechanism to determine if a coin is present.

46. A low power, coin operated telephone controller as in claim 1, wherein the sequence of wakeup diagnostics comprises determining if a coin entryway has been jammed.

47. A lower power, coin operated telephone controller as in claim 1, further comprising a ground lifting relay control circuit selectively controlled by the processing element so that power can be saved by not having a coil of the ground lifting relay dissipating power unnecessarily.

48. A low power, coin operated telephone controller as in claim 1, wherein the timing means comprises a real-time clock, and said processing element further comprises a microcontroller.

49. A low power, coin operated telephone controller as in claim 1, wherein said processing element further operates to monitor the status of the coin operated telephone.

50. A low power, coin operated telephone controller as in claim 1 or 49, wherein said processing element further operates to record the status of operation of the coin operated telephone.

51. A low power, coin operated telephone controller as in claim 49, wherein said processing element further operates to initiate communications with a phone number other than that of said telephone when said status warrants it.

52. A low power, coin operated telephone controller as in claim 1, wherein said processing element establishes as a condition of the acceptance of a coin that there is sufficient power available to operate a coin routing gate in the electronic coin mechanism.

53. A low power, coin operated telephone controller as in claim 1, wherein said processing element determines if sufficient power is stored on a capacitor in a gate solenoid power circuit before providing a control signal to cause the acceptance of a coin.

54. A low power, coin operated telephone controller, as in claim 5 or 6, wherein said monitor circuit monitors the states of one or more latchable switches.

55. A low power, coin operated telephone controller, as in claim 54, wherein one of said latchable switches is a vault door switch.

56. A low power, coin operated telephone controller, as in claim 54, wherein one of said latchable switches is a cash box switch.

57. A low power, coin operated telephone controller, as in claim 54, wherein one of said latchable switches is an upper housing removal detection switch.

58. A low power, coin operated telephone controller as in claim 1, further comprising a temporary register for storing the number of coins accepted.

59. A low power, coin operated telephone controller as in claim 1, further comprising a register for each coin denomination to store a running total of the number of coins of each denomination accepted.

60. A low power, coin operated telephone controller as in claim 1, further comprising a register for storing the total number of coins accepted.

61. The apparatus of claim 58, 59 or 60, wherein the processing element stores a programmable limit for the number of coins to be accepted before a report call is to be made that said coins should be collected.

62. The apparatus of claim 1 or 7, wherein the processing element detects when said phone has not been used for a predetermined time period.

63. The apparatus of claim 1 or 7, wherein the processing element detects when a handset of said telephone is placed on and picked up from its cradle a predetermined number of times without a call being initiated.

64. The apparatus of claim 1 or 7, wherein the processing element detects when money is inserted and a handset of said telephone is placed and picked up from its cradle a predetermined number of times without a call being initiated.

65. The apparatus of claim 1 or 7, wherein the processing element of said controller initiates a service call based upon detection of the occurrence of an event in excess of a predetermined number of times.

* * * * *

UNITED STATES PATENT AND TRADEMARK OFFICE
CERTIFICATE OF CORRECTION

PATENT NO. : 4,926,458
DATED : May 15, 1990
INVENTOR(S) : Reger et al.

It is certified that error appears in the above—identified patent and that said Letters Patent is hereby corrected as shown below:

In the Specification:

Column 3, line 16, delete "14" and insert --24'--.

Column 6, line 23, delete "230" and insert --110--.
Column 6, line 25, delete "110" and insert --230--.
Column 12, line 10, insert --6A-- following "Figs.".
Column 14, line 18, following "R24." insert --106-107--
Column 14, line 32, delete "63" and insert --6B--.
Column 16, line 29, insert --gate-- following "activate the"
Column 17, line 58, delete "U2" and insert --U22--.
Column 19, line 61, delete "DOwN" and insert --DOWN--.

Claim 9, column 25, line 11, delete "3, wherein said phone number" and insert --1, wherein the audio--.

Signed and Sealed this

Fifteenth Day of September, 1992

Attest:

DOUGLAS B. COMER

*Attesting Officer*  *Acting Commissioner of Patents and Trademarks*